United States Patent
Yamamoto

(10) Patent No.: US 10,144,548 B2
(45) Date of Patent: Dec. 4, 2018

(54) MULTI-LAYER BOTTLE AND METHOD FOR PRODUCING SAME

(71) Applicant: Mitsubishi Gas Chemical Company, Inc., Tokyo (JP)

(72) Inventor: Takashi Yamamoto, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 404 days.

(21) Appl. No.: 14/767,460

(22) PCT Filed: Feb. 12, 2014

(86) PCT No.: PCT/JP2014/053209
§ 371 (c)(1),
(2) Date: Aug. 12, 2015

(87) PCT Pub. No.: WO2014/126110
PCT Pub. Date: Aug. 21, 2014

(65) Prior Publication Data
US 2016/0001914 A1    Jan. 7, 2016

(30) Foreign Application Priority Data

Feb. 13, 2013 (JP) .................................. 2013-026065

(51) Int. Cl.
| | | |
|---|---|---|
| B29D 22/00 | (2006.01) | |
| B65D 1/02 | (2006.01) | |
| B32B 27/34 | (2006.01) | |
| B32B 27/36 | (2006.01) | |
| B32B 1/02 | (2006.01) | |
| B32B 7/00 | (2006.01) | |
| B32B 7/02 | (2006.01) | |
| B32B 27/00 | (2006.01) | |
| B32B 27/06 | (2006.01) | |
| B32B 27/08 | (2006.01) | |
| B32B 27/18 | (2006.01) | |
| B32B 1/00 | (2006.01) | |
| B32B 1/08 | (2006.01) | |

(52) U.S. Cl.
CPC .............. *B65D 1/0215* (2013.01); *B32B 1/00* (2013.01); *B32B 1/02* (2013.01); *B32B 1/08* (2013.01); *B32B 7/00* (2013.01); *B32B 7/02* (2013.01); *B32B 27/00* (2013.01); *B32B 27/06* (2013.01); *B32B 27/08* (2013.01); *B32B 27/18* (2013.01); *B32B 27/34* (2013.01); *B32B 27/36* (2013.01); *B32B 2250/03* (2013.01); *B32B 2250/40* (2013.01); *B32B 2264/00* (2013.01); *B32B 2264/102* (2013.01); *B32B 2264/105* (2013.01); *B32B 2307/306* (2013.01); *B32B 2307/3065* (2013.01); *B32B 2307/7244* (2013.01); *B32B 2307/732* (2013.01); *B32B 2307/734* (2013.01); *B32B 2439/00* (2013.01); *B32B 2439/40* (2013.01); *B32B 2439/60* (2013.01)

(58) Field of Classification Search
CPC ........... B65D 1/0215; B32B 1/00; B32B 7/00; B32B 7/02; B32B 27/00; B32B 27/06; B32B 27/08; B32B 27/18; B32B 1/08; B32B 27/34; B32B 27/36; B32B 1/02; B32B 2439/00; B32B 2307/306; B32B 2307/3065; B32B 2307/732; B32B 2307/734; B32B 2264/00; B32B 2439/40; B32B 2264/105; B32B 2264/102; B32B 2439/60; B32B 2250/03; B32B 2250/40; B32B 2307/7244

See application file for complete search history.

(56) References Cited

U.S. PATENT DOCUMENTS

| | | |
|---|---|---|
| 2010/0180979 A1 | 7/2010 | Mitadera et al. |
| 2013/0065004 A1 | 3/2013 | Yamamoto et al. |
| 2013/0065005 A1 | 3/2013 | Yamamoto et al. |

FOREIGN PATENT DOCUMENTS

| | | |
|---|---|---|
| EP | 1964673 A1 | 9/2008 |
| EP | 1974901 A1 | 10/2008 |
| JP | S49-38950 A | 4/1974 |
| JP | 2000-254963 A | 9/2000 |
| JP | 2001-164109 A | 6/2001 |
| JP | 2005-194328 A | 7/2005 |
| JP | 2005-194330 A | 7/2005 |
| JP | 3808847 B2 | 8/2006 |
| JP | 2007-92053 A | 4/2007 |
| JP | 2007-92054 A | 4/2007 |

(Continued)

OTHER PUBLICATIONS

International Search Report dated May 13, 2014 for PCT/JP2014/053209 and English translation of the same.

(Continued)

*Primary Examiner* — James C Yager
(74) *Attorney, Agent, or Firm* — Fitch, Even, Tabin & Flannery LLP

(57) ABSTRACT

In the multilayer bottle of the present invention, an outermost layer and an innermost layer are each composed of a polyester (Z1); a barrier layer is composed of a resin composition containing 40 to 99 parts by mass of a polyamide (X) and 1 to 60 parts by mass of a polyester (Z2); an alkali compound (A) is blended in the resin composition; and furthermore, the resin composition satisfies the following formulae (1) to (3).

$$0.01 \leq P \leq 6.5 \quad (1)$$

$$3.2 \leq M \leq 73.1 \quad (2)$$

$$M \geq 29.2 - 0.218\alpha \quad (3)$$

In the formulae, P represents a molar concentration (μmol/g) of phosphorus atoms; M represents a molar concentration (μmol/g) of alkali (earth) metal atoms; and α represents the parts by mass of the polyamide (X) contained in the resin composition.

7 Claims, No Drawings

(56) References Cited

FOREIGN PATENT DOCUMENTS

| | | |
|---|---|---|
| JP | 2007-223309 A | 9/2007 |
| JP | 2007-223667 A | 9/2007 |
| JP | 2012-111506 A | 6/2012 |
| WO | 2011/145497 A1 | 11/2011 |
| WO | 2011/145498 A1 | 11/2011 |

OTHER PUBLICATIONS

Extended European Search Report dated Jun. 3, 2016 in corresponding European Application No. 14751684.3 (6 Pages).

MULTI-LAYER BOTTLE AND METHOD FOR PRODUCING SAME

CROSS-REFERENCE TO RELATED APPLICATIONS

This application is a U.S. national phase application filed under 35 U.S.C. § 371 of International Application PCT/JP2014/053209, filed on Feb. 12, 2014, designating the United States, which claims priority from Japanese Application Number 2013-026065, filed Feb. 13, 2013, which are hereby incorporated herein by reference in their entirety.

TECHNICAL FIELD

The present invention relates to a multilayer bottle, and in more detail, the present invention relates to a multilayer bottle having an outermost layer and an innermost layer, and a barrier layer located therebetween.

BACKGROUND ART

At present, plastic containers (e.g., bottles, etc.) composed mainly of a polyester, such as polyethylene terephthalate (PET), etc., are widely used for teas, fruit juice beverages, carbonated beverages, and the like. In addition, the share of small-sized plastic bottles among plastic containers is increasing year by year. Following downsizing of the bottle, a ratio of the surface area per unit volume becomes large, and therefore, when downsizing the bottle, a shelf life of the contents tends to become short. In addition, recently, the application of the plastic container has been broadened, for example, by the sale of beer, which is susceptible to oxygen or light, being packaged in a plastic bottle, or the sale of a hot tea packaged in a plastic bottle. Under such a circumstance, a more enhancement in gas barrier properties against the plastic container is required.

In order to cope with the aforementioned requirement, as for a method of giving gas barrier properties to the bottle, there have been developed multilayer bottles comprising a polyester resin and a gas barrier resin; blend bottles; barrier-coating bottles produced by forming a carbon coat, a deposited coat, or a barrier resin coat onto a single-layer bottle made of a polyester resin; and the like.

In multilayer bottles, it is known that a thermoplastic polyester resin, such as PET, etc., is used for materials of an innermost layer and an outermost layer, and a thermoplastic gas barrier resin, such as polymetaxylyleneadipamide (polyamide MXD6), etc., is used for an interlayer. It is known that the multilayer bottle is obtained by preparing a preform (parison) having a three-layer or five-layer structure, which is obtained by filling a die cavity by injection molding these resins, and then subjecting the preform to biaxial stretch blow molding.

The aforementioned multilayer bottles are utilized for containers for beer, teas, carbonated beverages, and the like because of their good gas barrier properties. When the multilayer bottles are used in these applications, the quality of the contents filled therein can be maintain and the shelf life can be improved. On the other hand, there is a concern that the multilayer bottles undergo delamination between different resin layers, for example, between the innermost or outermost layer and the interlayer, resulting in damaging their commercial value.

As a method of improving such a problem, Patent Document 1 discloses a method in which when a resin constituting the innermost or outermost layer is injected into a die cavity at the end, a fixed amount of the resin constituting the innermost or outermost layer is allowed to flow back toward the side of the gas barrier layer. According to this method, the mixed resin enters between the layers, thereby improving the delamination resistance. However, the method described in Patent Document 1 involves such a problem that use of a special apparatus is required in order to allow the resin to flow back.

In addition, as other solution, there is known a method in which an interlayer is formulated with a blend of a polyester resin, such as PET, etc., and polyamide MXD6, to increase an affinity between the polyester resin as a contact layer and the interlayer, thereby improving the delamination resistance (see Patent Document 2). This method is advantageous from the standpoint of costs because a large modification of a molding apparatus is not required.

However, as compared with the case where the formulation of the interlayer is made of only polyamide MXD6, in this method, the heat stability of the resin is reduced more than expected, and the resin remains in the inside of a molding machine for a long period of time when molding a bottle, and thus, the deteriorated matter becomes scorch and contaminates the product, resulting in deteriorating the product yield. Accordingly, it becomes necessary to use a purging agent during the production, or to remove the deteriorated matter by, for example, disassembling and cleaning the die, and therefore, the stable production is disturbed. In addition, the scorch sometimes plugs a passage of the inside of the molding machine, thereby making it impossible to undergo molding.

In addition, conventionally, in order to prevent deterioration of polyamide resins, the apparatus is improved to minimize a remaining portion in the inside of the molding machine, or plating is conducted. This can suppress the formation of a deteriorated matter, but does not completely solve the problem.

Meanwhile, a variety of methods of suppressing the generation of a fish eye or a gel at the time of molding by improving materials in various ways are devised (see Patent Documents 4 to 9). However, any useful method of suppressing the generation of scorch at the time of bottle molding by improving materials has not hitherto been found.

CITATION LIST

Patent Document

Patent Document 1: JP-A 2000-254963
Patent Document 2: JP-A 2007-223667
Patent Document 3: JP-A 2001-164109
Patent Document 4: Japanese Patent No. 3808847
Patent Document 5: JP-A S49-38950
Patent Document 6: JP-A 2005-194328
Patent Document 7: JP-A 2005-194330
Patent Document 8: JP-A 2007-92053
Patent Document 9: JP-A 2007-92054

SUMMARY OF INVENTION

An object of the present invention is to provide a multilayer bottle, which is able to solve the aforementioned problem, less in delamination between layers, good in moldability, and less in the generation of scorch at the time of molding.

The present inventors made extensive and intensive investigations. As a result, it has been found that in a barrier layer composed of a blend of a polyester and a polyamide, the degree of heat deterioration at the time of molding varies depending upon a phosphorus concentration or a concentration of an alkali (earth) metal in a resin composition. In addition, as a result of further investigations, it has also been found that an appropriate concentration of the alkali (earth) metal in the resin composition also varies according to the blending ratio of the polyester and the polyamide. Then, it has been found from such knowledge that by using a specified resin composition for a barrier layer, a multilayer bottle, which is able to suppress the generation of scorch at the time of molding while making moldability good, less in delamination between layers, and excellent in gas barrier properties, can be provided, leading to accomplishment of the following present invention.

Specifically, the present invention is concerned with a multilayer bottle including an outermost layer and an innermost layer and at least one barrier layer located between the outermost layer and the innermost layer, wherein the outermost layer and the innermost layer are each composed of a polyester (Z1); the barrier layer is composed of a resin composition containing 40 to 99 parts by mass of a polyamide (X) comprising a diamine unit containing 70 mol % or more of a m-xylylenediamine unit and a dicarboxylic acid unit and 1 to 60 parts by mass of a polyester (Z2) provided that a total sum of the polyamide (X) and the polyester (Z2) is 100 parts by mass; an alkali compound (A) is blended in the resin composition; and the resin composition further satisfies the following formulae (1) to (3).

$$0.01 \leq P \leq 6.5 \quad (1)$$

$$3.2 \leq M \leq 73.1 \quad (2)$$

$$M \geq 29.2 - 0.218\alpha \quad (3)$$

wherein P represents a molar concentration (µmol/g) of phosphorus atoms contained per gram of the resin composition; M represents a sum of values (µmol/g) obtained by multiplying the molar concentration of alkali metal atoms and the molar concentration of alkaline earth metal atoms, each contained per gram of the resin composition, by valences thereof, respectively; and α represents the parts by mass of the polyamide (X) contained in the resin composition in the formulae.

The multilayer bottle of the present invention is less in the generation of scorch at the time of molding while making moldability good, high in delamination resistance, and excellent in gas barrier properties, and therefore, its industrial value can be increased.

DESCRIPTION OF EMBODIMENTS

The present invention is hereinafter described by reference to embodiments.
[Multilayer Bottle]
The multilayer bottle of the present invention includes an outermost layer and an innermost layer, and at least one barrier layer located between the outermost layer and the innermost layer. In the multilayer bottle, the outermost layer and the innermost layer are each composed of a polyester (Z1). In addition, the barrier layer is composed of a resin composition containing a polyamide (X) and a polyester (Z2), and an alkali compound (A) is blended in the resin composition.
[Polyamide (X)]
The polyamide (X) that is contained in the resin composition constituting the barrier layer is composed of a diamine unit containing 70 mol % or more of a m-xylylenediamine unit and a dicarboxylic acid unit; and the polyamide (X) is obtained by polycondensing a diamine component containing 70 mol % or more of m-xylylenediamine and a dicarboxylic acid component. The polyamide (X) has a high barrier performance, exhibits excellent characteristics in co-injection moldability and co-stretch blow moldability with a polyester, such as polyethylene terephthalate, etc., and has good shaping properties.

The diamine unit constituting the polyamide (X) contains 70 mol % or more, preferably 80 mol % or more, and more preferably 90 mol % or more of a m-xylylenediamine unit. With 70 mol % or more of the m-xylylenediamine unit in the diamine unit, the polyamide (X) can show excellent gas barrier properties.

Examples of a compound that can constitute a diamine unit other than the m-xylylenediamine unit include aliphatic diamines, such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, 2,4,4-trimethylhexamethylenediamine, etc.; alicyclic diamines, such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, bis(aminomethyl)tricyclodecane, etc.; and aromatic ring-containing diamines, such as bis(4-aminophenyl) ether, paraphenylenediamine, p-xylylenediamine, bis(aminomethyl)naphthalene, etc., but are not limited to these.

Examples of a compound that can constitute the dicarboxylic acid unit constituting the polyamide (X) include aliphatic dicarboxylic acids represented by α,ω-linear aliphatic dicarboxylic acids having 4 to 20 carbon atoms, such as succinic acid, glutaric acid, pimelic acid, suberic acid, azelaic acid, adipic acid, sebacic acid, undecanedioic acid, dodecanedioic acid, etc.; and aromatic dicarboxylic acids, such as terephthalic acid, isophthalic acid, 2,6-naphthalenedicarboxylic acid, etc., but are not limited to these. Among these, adipic acid and sebacic acid are preferred.

The dicarboxylic acid unit constituting the polyamide (X) contains preferably 50 mol % or more, more preferably 70 mol % or more, still more preferably 80 mol % or more, and especially preferably 90 mol % or more of the α,ω-linear aliphatic dicarboxylic acid unit having 4 to 20 carbon atoms. When falling within the foregoing range, molding of a multilayer bottle is easy.

As the polyamide (X) which is preferably utilized in the present invention, a polyamide composed of a diamine unit containing 70 mol % or more of a m-xylylenediamine unit and a dicarboxylic acid component containing 70 mol % or more, preferably 80 mol % or more, and more preferably 90 mol % or more of an adipic acid unit is exemplified. When 70 mol % or more of the adipic acid unit is contained in the dicarboxylic acid unit, lowering of gas barrier properties or excessive lowering of crystallinity can be avoided. As a compound that can constitute the dicarboxylic acid unit other than the adipic acid unit, at least one of α,ω-linear aliphatic dicarboxylic acid having 4 to 20 carbon atoms is preferably used.

In addition, as the polyamide (X) which is preferably utilized in the present invention, a polyamide composed of a diamine unit containing 70 mol % or more of a m-xylylenediamine unit and a dicarboxylic acid unit containing 70 to 99 mol % of an adipic acid unit and 1 to 30 mol % of an isophthalic acid unit is exemplified. By adding the isophthalic acid unit as the dicarboxylic acid unit, the melting point is lowered, so that the molding processing temperature can be decreased. Accordingly, a thermal history during molding of the resin composition is reduced, so that the formation of scorch can be suppressed.

In addition, as the polyamide (X) which is preferably utilized in the present invention, a polyamide composed of a diamine unit containing 70 mol % or more of a m-xylylenediamine unit and a dicarboxylic acid unit containing 70 mol % or more, preferably 80 mol % or more, and still more preferably 90 mol % or more of a sebacic acid unit is exemplified. When 70 mol % or more of the sebacic acid unit is contained in the dicarboxylic acid unit, the melting point is low, so that the molding processing temperature can be decreased. Accordingly, the formation of scorch can be suppressed. As a compound that can constitute the dicarboxylic acid unit other than the sebacic acid unit, at least one of α,ω-linear aliphatic dicarboxylic acid having 4 to 20 carbon atoms is preferably used.

Besides the aforementioned diamine component and dicarboxylic acid component, as a component constituting the polyamide (X), lactams, such as ε-caprolactam, laurolactam, etc., or aliphatic aminocarboxylic acids, such as aminocaproic acid, aminoundecanoic acid, etc., can also be used as a copolymerization component so long as the effects of the present invention are not impaired.

The number average molecular weight of the polyamide (X) is preferably 10,000 to 50,000, more preferably 15,000 to 45,000, and still more preferably 20,000 to 40,000, so that the moldability on the occasion of molding a multilayer bottle is good.

The number average molecular weight of the polyamide (X) is calculated according to the following formula (4).

$$\text{Number average molecular weight} = 2 \times 1000000 / ([COOH]+[NH_2]) \quad (4)$$

(In the formula, [COOH] represents a terminal carboxyl group concentration (μmol/g) in the polyamide (X), and [NH$_2$] represents a terminal amino group concentration (μmol/g) in the polyamide (X).)

In the present invention, as for the terminal amino group concentration, a value calculated by subjecting the polyamide dissolved in a phenol/ethanol mixed solution to neutral titration with a dilute hydrochloric acid aqueous solution is used; and as for the terminal carboxyl group concentration, a value calculated by subjecting the polyamide dissolved in benzyl alcohol to neutral titration with a sodium hydroxide aqueous solution is used.

The polyamide (X) of the present invention is one obtained through polycondensation in the presence of a phosphorus atom-containing compound (B0). In this way, by using the phosphorus atom-containing compound (B0) in polycondensation, not only polymerizability of the polyamide can be good, but also coloration of the polyamide (X) can be prevented.

Preferred specific examples of the phosphorus atom-containing compound (B0) include hypophosphorous acid compounds (also referred to as phosphinic acid compounds or phosphonous acid compounds), phosphorous acid compounds (also referred to as phosphonic acid compounds), and the like, but are not particularly limited to these. The phosphorus atom-containing compound (B0) may also be a metal salt or an alkali metal salt.

Specific examples of the hypophosphorous acid compound include hypophosphorous acid; hypophosphorous acid metal salts, such as sodium hypophosphite, potassium hypophosphite, lithium hypophosphite, etc.; hypophosphorous acid compounds, such as ethyl hypophosphite, dimethylphosphinic acid, phenylmethylphosphinic acid, phenylphosphonous acid, ethyl phenylphosphonoate, etc.; phenylphosphonous acid metal salts, such as sodium phenylphosphonoate, potassium phenylphosphonoate, lithium phenylphosphonoate, etc.; and the like.

Specific examples of the phosphorous acid compound include phosphorous acid; pyrophosphorous acid; phosphorous acid metal salts, such as sodium hydrogenphosphite, sodium phosphite, etc.; phosphorous acid compounds, such as triethyl phosphite, triphenyl phosphite, ethylphosphonic acid, phenylphosphonic acid, diethyl phenylphosphonate, etc.; sodium ethylphosphonate, potassium ethylphosphonate; phenylphosphonic acid metal salts, such as sodium phenylphosphonate, potassium phenylphosphonate, lithium phenylphosphonate, etc.; and the like.

The phosphorus atom-containing compound (B0) may be a single compound or a combination of two or more compounds among those described above. Among those described above, from the viewpoint of an effect for promoting a polymerization reaction of the polyamide (X) and the viewpoint of an effect for preventing coloration, hypophosphorous acid metal salt, such as sodium hypophosphite, potassium hypophosphite, lithium hypophosphite, etc., are preferred, and sodium hypophosphite is more preferred.

The polyamide (X) of the present invention is subjected to polycondensation in the presence of the phosphorus atom-containing compound (B0), whereby the phosphorus atom is contained therein. A molar concentration (p0) of the phosphorus atoms contained per gram of the polyamide (X) of the present invention is preferably 0.03 to 8.0 μmol/g, more preferably 0.06 to 6.0 μmol/g, and most preferably 0.1 to 5.0 μmol/g.

When the molar concentration of the phosphorus atoms is the aforementioned lower limit or more, a polymerization rate of the polyamide becomes good, and coloration of the polyamide to be caused during the polymerization or molding is prevented. In addition, when the molar concentration of the phosphorus atoms is the aforementioned upper limit or less, a gelation reaction of the polyamide is prevented, a degree of transparency of a molded article is good, and an increase of a back pressure by plugging of a filter, which is considered to be caused due to a heat-denatured material of the phosphorus atom-containing compound (B0) at the time of molding processing, is also prevented.

In the present invention, it is preferred that the polycondensation of the polyamide (X) is conducted in the presence of, in addition to the phosphorus atom-containing compound (B0), an alkali metal compound (C0). In order to prevent the occurrence of coloration of the polyamide (X) during the polycondensation, it is necessary to make a sufficient amount of the phosphorus atom-containing compound (B0) existent. However, if the use amount of the phosphorus atom-containing compound (B0) is too large, there is a concern that not only an amidation reaction rate is excessively promoted, thereby making control of the polymerization difficult, but also the formation of scorch at the time of molding processing of the polyamide (X) is caused. For that reason, from the viewpoint of regulating the amidation reaction rate, it is preferred to make the alkali metal compound (C0) coexistent at the time of polycondensation.

Though the alkali metal compound (C0) is not particularly limited, preferred specific examples thereof include alkali metal hydroxides and alkali metal acetates. Examples of the alkali metal hydroxide include lithium hydroxide, sodium hydroxide, potassium hydroxide, rubidium hydroxide, and cesium hydroxide, and examples of the alkali metal acetate include lithium acetate, sodium acetate, potassium acetate, rubidium acetate, and cesium acetate, with sodium acetate being preferred.

In the case of using the alkali metal compound (C0) on the occasion of polycondensing the polyamide (X), the use amount of the alkali metal compound (C0) is determined, so that a value obtained by dividing a molar number of the alkali metal compound (C0) by a molar number of the phosphorus atom-containing compound (B0) ranges preferably from 0.5 to 1, more preferably from 0.55 to 0.95, and still more preferably from 0.6 to 0.9, from the viewpoint of suppressing the formation of scorch.

In addition, the total molar concentration of alkali metal atoms and alkaline earth metal atoms in the polyamide (X) (hereinafter referred to as the total molar concentration of the alkali (earth) metal atoms) (m0) is, for example, 0.1 to 15 µmol/g, and preferably 0.2 to 12 µmol/g.

[Polyesters (Z1) and (Z2)]

It is preferred that each of the polyester (Z1) constituting each of the outermost layer and the innermost layer and the polyester (Z2) which is contained in the resin composition constituting the barrier layer is constituted of a polyester composed of a dicarboxylic acid unit containing 80 mol % or more of a terephthalic acid unit and a diol unit containing 80 mol % or more of an ethylene glycol unit.

In these polyester (Z1) and polyester (Z2), it is more preferred that the dicarboxylic acid unit contains 90 mol % or more of a terephthalic acid unit, and it is more preferred that the diol unit contains 90 mol % or more of an ethylene glycol unit. Each of the polyesters (Z1) and (Z2) is obtained by subjecting a dicarboxylic acid component containing preferably 80 mol % or more, and more preferably 90 mol % or more of terephthalic acid and a diol component containing preferably 80 mol % or more, and more preferably 90 mol % or more of ethylene glycol to a polycondensation reaction.

The polyester (Z1) and the polyester (Z2) may be the same kind as or a different kind from each other.

Each of the polyester (Z1) and the polyester (Z2) may contain, as a constituent unit, a bifunctional compound unit other than the terephthalic acid unit and the ethylene glycol unit. An amount of the bifunctional compound unit is preferably about 20 mol % at maximum, and more preferably 10 mol % at maximum relative to a total mole of the whole of the constituent units constituting the polyester resin (A). Preferred examples of the bifunctional compound unit which is contained in each of the polyester (Z1) and the polyester (Z2) include an aliphatic bifunctional compound unit, an alicyclic bifunctional compound unit, and an aromatic bifunctional compound unit.

Examples of a compound that can constitute the aliphatic bifunctional compound unit include aliphatic dicarboxylic acids, such as malonic acid, succinic acid, adipic acid, azelaic acid, sebacic acid, etc.; aliphatic hydroxycarboxylic acids, such as 10-hydroxyoctadecanoic acid, lactic acid, hydroxyacrylic acid, 2-hydroxy-2-methylpropionic acid, hydroxybutyric acid, etc.; and aliphatic diols, such as 2-butene-1,4-diol, trimethylene glycol, tetramethylene glycol, hexamethylene glycol, neopentyl glycol, methylpentanediol, diethylene glycol, etc. Neopentyl glycol is preferred because a storage container composed of a polyester resin containing its unit is easily produced without lowering the heat resistance.

Though a compound that can constitute the aromatic bifunctional compound unit is not particularly limited, specific examples thereof include aromatic dicarboxylic acids other than terephthalic acid, such as isophthalic acid, phthalic acid, biphenyldicarboxylic acid, diphenyl ether-dicarboxylic acid, diphenyl sulfone-dicarboxylic acid, diphenyl ketone-dicarboxylic acid, sodium sulfoisophthalate, 2,6-naphthalenedicarboxylic acid, 1,4-naphthalenedicarboxylic acid, 2,7-naphthalenedicarboxylic acid, etc.; aromatic hydroxycarboxylic acids, such as hydroxybenzoic acid, hydroxytoluic acid, hydroxynaphthoic acid, 3-(hydroxyphenyl)propionic acid, hydroxyphenylacetic acid, 3-hydroxy-3-phenylpropionic acid, etc.; and aromatic diols, such as bisphenol compounds, hydroquinone compounds, etc. At least one of isophthalic acid units, phthalic acid units, naphthalenedicarboxylic acid units, and 4,4'-biphenyldicarboxylic acid units is preferred as the aromatic dicarboxylic acid unit regarding the bifunctional compound unit because the production of a copolyester containing unit thereof is easy, and monomer costs thereof are low.

As an example of the particularly preferred compound that can constitute an aromatic bifunctional compound unit, isophthalic acid is exemplified because of excellent moldability of a copolymerized polyester resin. The isophthalic acid copolymerized polyester resin is excellent further from the standpoints of preventing whitening of a molded article by reducing the crystallization rate, and increasing heat stability at the time of molding by decreasing the melting point. In the case of using isophthalic acid in combination, its proportion is 1 to 10 mol %, preferably 1 to 8 mol %, and more preferably 1 to 6 mol % of the dicarboxylic acid component.

As an example of the particularly preferred compound that can constitute the aromatic bifunctional compound unit, naphthalenedicarboxylic acid is exemplified. The naphthalenedicarboxylic acid copolymerized polyester resin increases a glass transition point of the resin and enhances heat resistance. As well, it is suitable for the production of a multilayer bottle for which resistance to ultraviolet rays is required, because the naphthalenedicarboxylic acid copolymerized polyester resin absorbs ultraviolet rays. For the purpose of protecting the contents from UV light, a proportion of the naphthalenedicarboxylic acid unit which is used for the production of a storage container is 0.1 to 15 mol %, and preferably 1.0 to 10 mol % relative to the dicarboxylic acid component. In addition, the naphthalenedicarboxylic acid is preferably a 2,6-naphthalenedicarboxylic acid component because of easy production and high economy.

As a specific example of a compound that can constitute an aromatic bifunctional compound unit, other than those described above, a diol unit derived from 2,2-bis(4-(2-hydroxyethoxy)phenyl)propane, 2-(4-(2-(2-hydroxyethoxy)ethoxy)phenyl)-2-(4-(2-hydroxyethoxy)phenyl)propane, 2,2-bis(4-(2-(2-hydroxyethoxy) ethoxy)phenyl)propane, bis(4-(2-hydroxyethoxy)phenyl) sulfone, (4-((2-hydroxyethoxy)ethoxy)phenyl)-(4-(2-hydroxyethoxy)phenyl) sulfone, 1,1-bis(4-(2-hydroxyethoxy)phenyl)cyclohexane, 1-(4-(2-(2-hydroxyethoxy)ethoxy)ethoxy)phenyl)-1-(4-(2-hydroxyethoxy)phenyl)cyclohexane, 1,1-bis(4-(2-(2-hydroxyethoxy)ethoxy)phenyl)cyclohexane, 2,2-bis(4-(2-hydroxyethoxy)-2,3,5,6-tetrabromophenyl)propane, 1,4-bis(2-hydroxyethoxy)benzene, 1-(2-hydroxyethoxy)-4-(2-(2-hydroxyethoxy)ethoxy)benzene, and 1,4-bis(2-(2-hydroxyethoxy)ethoxy)benzene are exemplified, but are not limited to these. Furthermore, among those diol units, a 2,2-bis(4-(2-hydroxyethoxy)phenyl)propane unit, a bis(4-(2-hydroxyethoxy)phenyl) sulfone unit, and a 1,4-bis(2-hydroxyethoxy)benzene unit are preferred because these are easy to produce while having excellent melt stability and the copolymerized polyester resin containing such a diol unit has excellent color tone and excellent impact resistance.

Examples of a compound that can constitute an alicyclic bifunctional compound unit include alicyclic dicarboxylic acids, such as cyclohexanedicarboxylic acid, norbornenedicarboxylic acid, tricyclodecanedicarboxylic acid, etc.; alicyclic hydroxycarboxylic acids, such as hydroxymethylcyclohexane-carboxylic acid, hydroxymethylnorbornenecarboxylic acid, hydroxymethyltricyclodecanecarboxylic acid, etc.; and alicyclic diols, such as cyclohexanedimethanol, norbornenedimethanol, tricyclodecanedimethanol, etc. Preferred examples of the alicyclic bifunctional compound unit include 1,2-cyclohexanedimethanol, 1,3-cyclohexanedimethanol, 1,4-cyclohexanedimethanol, 1,2-cyclohexanedicarboxylic acid, 1,3-cyclohexanedicarboxylic acid, and 1,4-cyclohexanedicarboxylic acid. A copolymerized polyester resin containing such a unit is easy to produce, and the unit improves drop-impact strength and transparency of the multilayer bottle. Among those described above, preferred are 1,4-cyclohexanedimethanol and 1,4-cyclohexanedicarboxylic acid because they are easily available and highly improves drop-impact strength.

Furthermore, each of the polyester (Z1) and the polyester (Z2) may contain a monofunctional compound derived from monocarboxylic acids, monoalcohols, and ester-forming derivatives thereof. Specific examples thereof include aromatic monofunctional carboxylic acids, such as benzoic acid, o-methoxybenzoic acid, m-methoxybenzoic acid, p-methoxybenzoic acid, o-methylbenzoic acid, m-methylbenzoic acid, p-methylbenzoic acid, 2,3-dimethylbenzoic acid, 2,4-dimethylbenzoic acid, 2,5-dimethylbenzoic acid, 2,6-dimethylbenzoic acid, 3,4-dimethylbenzoic acid, 3,5-dimethylbenzoic acid, 2,4,6-trimethylbenzoic acid, 2,4,6-trimethoxybenzoic acid, 3,4,5-trimethoxybenzoic acid, 1-naphthoic acid, 2-naphthoic acid, 2-biphenylcarboxylic acid, 1-naphthaleneacetic acid, 2-naphthaleneacetic acid, etc.; aliphatic monocarboxylic acids, such as propionic acid, butyric acid, n-octanoic acid, n-nonanoic acid, myristic acid, pentadecanoic acid, stearic acid, oleic acid, linoleic acid, linolenic acid, etc.; ester-forming derivatives of those monocarboxylic acids; aromatic alcohols, such as benzyl alcohol, 2,5-dimethylbenzyl alcohol, 2-phenethyl alcohol, phenol, 1-naphthol, 2-naphthol, etc.; and aliphatic or alicyclic monoalcohols, such as butyl alcohol, hexyl alcohol, octyl alcohol, pentadecyl alcohol, stearyl alcohol, polyethylene glycol monoalkyl ethers, polypropylene glycol monoalkyl ethers, polytetramethylene glycol monoalkyl ethers, oleyl alcohol, cyclododecanol, etc. In particular, from the viewpoints of easy production of the polyester and production costs thereof, benzoic acid, 2,4,6-trimethoxybenzoic acid, 2-naphthoic acid, stearic acid, and stearyl alcohol are preferred. A proportion of the monofunctional compound unit is 5 mol % or less, preferably 3 mol % or less, and more preferably 1 mol % or less relative to a total mole of the whole of the constituent units of the polyester resin. Such a unit functions as a block at terminal groups of the molecular chain or the terminal groups of the branched chain in the polyester resin in the presence of the monofunctional compound, whereby the polyester resin can be suppressed from being excessively crosslinked and prevented from being gelled.

Furthermore, each of the polyester (Z1) and the polyester (Z2) may have, as a copolymerization component, a polyfunctional compound unit having at least three groups selected from a carboxyl group, a hydroxyl group, and an ester-forming group thereof. Examples of a compound that can constitute the polyfunctional compound unit include aromatic polycarboxylic acids, such as trimesic acid, trimellitic acid, 1,2,3-benzenetricarboxylic acid, pyromellitic acid, 1,4,5,8-naphthalenetetracarboxylic acid, etc.; aliphatic polycarboxylic acids, such as 1,3,5-cyclohexanetricarboxylic acid, etc.; aromatic polyhydric alcohols, such as 1,3,5-trihydroxybenzene, etc.; aliphatic or alicyclic polyhydric alcohols, such as trimethylolpropane, pentaerythritol, glycerin, 1,3,5-cyclohexanetriol, etc.; aromatic hydroxycarboxylic acids, such as 4-hydroxyisophthalic acid, 3-hydroxyisophthalic acid, 2,3-dihydroxybenzoic acid, 2,4-dihydroxybenzoic acid, 2,5-dihydroxybenzoic acid, 2,6-dihydroxybenzoic acid, protocatechuic acid, gallic acid, 2,4-dihydroxyphenylacetic acid, etc.; aliphatic hydroxycarboxylic acids, such as tartaric acid, malic acid, etc.; and ester-forming derivatives thereof. A proportion of the polyfunctional compound unit in the polyester resin is preferably less than 0.5 mol % relative to a total molar number of the whole of the constituent units of the polyester. Among those described above, preferred examples of the polyester resin include one having a polyfunctional compound unit derived from trimellitic acid, pyromellitic acid, trimesic acid, trimethylolpropane, and pentaerythritol, from the viewpoints of easy production of each of the polyester (Z1) and the polyester (Z2) and production costs thereof.

Furthermore, a part of each of the polyester (Z1) and the polyester (Z2) may contain at least one metal sulfonate. In general, in the case of melt kneading the polyester (Z1), and the polyester (Z2) with the polyamide (X) and then conducting molding, it is known that the both resins are not completely compatibilized but form a fine dispersion, respectively, and in particular, a fine structure called to be a sea-island structure, in which the major component forms a matrix structure and the minor component forms a domain structure, is continuously formed. If such a structure is formed, when light transmits through the resin composition, the light is refracted at an interface between the matrix and the domain and randomly dispersed, resulting in impairing the transparency of the multilayer bottle made of a resin composition. At this time, the phase dispersibility between the polyester resin and the polyamide resin is enhanced by the metal sulfonate, and the particle is miniaturized, resulting in making it possible to improve an appearance of the multilayer bottle.

The concentration of the metal sulfonate is preferably in the range of from 0.05 to 10 mol %, more preferably in the range of from 0.1 to 5 mol %, still more preferably in the range of from 0.2 to 4 mol %, and most preferably in the range of from 0.4 to 2 mol % relative to the whole of the dicarboxylic acid monomer units in each of the polyester (Z1) and the polyester (Z2). The amount of the metal sulfonate can be determined by measuring the amounts of sulfur and the metal in the polyester, followed by conversion into a molar amount.

The metal sulfonate may be introduced into the polyester by using a metal sulfonate group-containing compound as a copolymerization component of the polyester.

Specific examples of the metal sulfonate group-containing compound include sodium 5-sulfoisophthalate, lithium 5-sulfoisophthalate, potassium sulfoisophthalate, potassium sulfoterephthalate, calcium 5-sulfoisophthalate, potassium 4,4'-di(carbomethoxy)biphenyl sulfonate, lithium 3,5-di(carbomethoxy)benzene sulfonate, sodium p-carbomethoxy benzene sulfonate, dipotassium 5-carbomethoxy-1,3-disulfonate, sodio 4-sulfonaphthalene-2,7-dicarboxylic acid, 4-lithio sulfophenyl-3,5-dicarboxy benzene sulfonate, 6-sodiosulfo-2-naphthyl-3,5-dicarbomethoxy benzene sulfonate, dimethyl 5-[4-(sodiosulfo)phenoxy]isophthalate, and the like.

Each of the polyester (Z1) and the polyester (Z2) may possibly contain a small amount of a by-product unit of diethylene glycol which is a dimer of an ethylene glycol component and is formed in a small amount in the production step of a polyester resin. In order that the multilayer bottle keeps good physical properties, it is preferred that a proportion of the diethylene glycol unit in the polyester resin is low as far as possible. The proportion of the diethylene glycol unit in each of the polyester (Z1) and the polyester (Z2) is preferably 3 mol % or less, and more preferably 1 to 2 mol % relative to a total molar number of the whole of the constituent units of each of the polyester (Z1) and the polyester (Z2).

Preferred examples of each of the polyester (Z1) and the polyester (Z2) include a polyethylene terephthalate resin, a polyethylene terephthalate-isophthalate copolymer resin, a polyethylene-1,4-cyclohexane dimethylene-terephthalate copolymer resin, a polyethylene-2,6-naphthalene dicarboxylate-terephthalate copolymer resin, a polyethylene-terephthalate-4,4'-biphenyl dicarboxylate resin, a sodium sulfoisophthalate copolymerized polyethylene terephthalate resin, a lithium sulfoisophthalate copolymerized polyethylene terephthalate resin, and the like, but are not particularly limited to these. More preferred examples of the polyester resin (A) include a polyethylene terephthalate resin, a polyethylene terephthalate-isophthalate copolymer resin, a polyethylene-1,4-cyclohexane dimethylene-terephthalate copolymer resin, a sodium sulfoisophthalate copolymerized polyethylene terephthalate resin, and a lithium sulfoisophthalate copolymerized polyethylene terephthalate resin.

In addition, a polyethylene terephthalate resin is especially preferably used as each of the polyester (Z1) and the polyester (Z2). In the multilayer bottle of the present invention, it becomes possible to exhibit excellent characteristics in all of transparency, mechanical strength, injection moldability, and stretch blow moldability, which polyethylene terephthalate has.

A water content of each of the polyester (Z1) and the polyester (Z2) is preferably 200 ppm or less, and more preferably 100 ppm or less. In this case, the polyester resin may be dried to make the aforementioned content for the use. When the water content falls within the foregoing range, the molecular weight is not extremely decreased by hydrolysis of the polyester in the melt mixing step.

In addition, each of the polyester (Z1) and the polyester (Z2) may contain a regenerated polyester, or a material originated from a used polyester or an industrially recycled polyester, such as a polyester monomer, a catalyst, and an oligomer.

For the production of a polyester, known methods, such as a direct esterification method and an ester interchange method, can be applied. Examples of a polycondensation catalyst which is used at the time of production of a polyester include known compounds inclusive of antimony compounds, such as antimony trioxide, antimony pentoxide, etc., germanium compounds, such as germanium oxide, etc., titanium compounds, such as titanium acetate, etc., aluminum compounds, such as aluminum chloride, etc., and the like, but are not limited to these. In addition, as other production methods, there is exemplified a method of subjecting polyesters of a different kind from each other to ester interchange by a method, such as long-time residence and/or high-temperature extrusion.

In addition, a known phosphorous atom-containing compound (B2) can be used as a polymerization co-catalyst which is used at the time of production of a polyester.

Examples of the phosphorous atom-containing compound (B2) which is used as the polymerization co-catalyst include phosphoric acid compounds, phosphorous acid compounds, phosphonic acid compounds, phosphinic acid compounds, phosphine oxide compounds, and phosphine compounds. Specific examples thereof include phosphoric acid compounds, such as phosphoric acid, trimethyl phosphate, triethyl phosphate, triphenyl phosphate, etc.; phosphorous acid compounds, such as phosphorous acid, trimethyl phosphite, triethyl phosphite, triphenyl phosphite, etc.; phosphonic acid compounds, such as methylphosphonic acid, ethylphosphonic acid, propylphosphonic acid, isopropylphosphonic acid, butylphosphonic acid, phenylphosphonic acid, benzylphosphonic acid, tolylphosphonic acid, xylylphosphonic acid, biphenylphosphonic acid, naphthylphosphonic acid, anthrylphosphonic acid, 2-carboxyphenylphosphonic acid, 3-carboxyphenylphosphonic acid, 4-carboxyphenylphosphonic acid, 2,3-dicarboxyphenylphosphonic acid, 2,4-dicarboxyphenylphosphonic acid, 2,5-dicarboxyphenylphosphonic acid, 2,6-dicarboxyphenylphosphonic acid, 3,4-dicarboxyphenylphosphonic acid, 3,5-dicarboxyphenylphosphonic acid, 2,3,4-tricarboxyphenylphosphonic acid, 2,3,5-tricarboxyphenylphosphonic acid, 2,3,6-tricarboxyphenylphosphonic acid, 2,4,5-tricarboxyphenylphosphonic acid, 2,4,6-tricarboxyphenylphosphonic acid, dimethyl methylphosphonate, diethyl methylphosphonate, dimethyl ethylphosphonate, diethyl ethylphosphonate, dimethyl phenylphosphonate, diethyl phenylphosphonate, diphenyl phenylphosphonate, dimethyl benzylphosphonate, diethyl benzylphosphonate, diphenyl benzylphosphonate, lithium (ethyl 3,5-di-tert-butyl-4-hydroxybenzylphosphonate), sodium (ethyl 3,5-di-tert-butyl-4-hydroxybenzylphosphonate), magnesium bis(ethyl 3,5-di-tert-butyl-4-hydroxybenzylphosphonate), calcium bis(ethyl 3,5-di-tert-butyl-4-hydroxybenzylphosphonate), diethylphosphonoacetic acid, methyl diethylphosphonoacetate, ethyl diethylphosphonoacetate, etc.; phosphinic acid compounds, such as hypophosphorous acid, sodium hypophosphite, methylphosphinic acid, ethylphosphinic acid, propylphosphinic acid, isopropylphosphinic acid, butylphosphinic acid, phenylphosphinic acid, tolylphosphinic acid, xylylphosphinic acid, biphenylphosphinic acid, diphenylphosphinic acid, dimethylphosphinic acid, diethylphosphinic acid, dipropylphosphinic acid, diisopropylphosphinic acid, dibutylphosphinic acid, ditolylphosphinic acid, dixylylphosphinic acid, dibiphenylphosphinic acid, naphthylphosphinic acid, anthrylphosphinic acid, 2-carboxyphenylphosphinic acid, 3-carboxyphenylphosphinic acid, 4-carboxyphenylphosphinic acid, 2,3-dicarboxyphenylphosphinic acid, 2,4-dicarboxyphenylphosphinic acid, 2,5-dicarboxyphenylphosphinic acid, 2,6-dicarboxyphenylphosphinic acid, 3,4-dicarboxyphenylphosphinic acid, 3,5-dicarboxyphenylphosphinic acid, 2,3,4-tricarboxyphenylphosphinic acid, 2,3,5-tricarboxyphenylphosphinic acid, 2,3,6-tricarboxyphenylphosphinic acid, 2,4,5-tricarboxyphenylphosphinic acid, 2,4,6-tricarboxyphenylphosphinic acid, bis(2-carboxyphenyl)phosphinic acid, bis(3-carboxyphenyl)phosphinic acid, bis(4-carboxyphenyl)phosphinic acid, bis(2,3-dicarboxyphenyl)phosphinic acid, bis(2,4-dicarboxyphenyl)phosphinic acid, bis(2,5-dicarboxyphenyl)phosphinic acid, bis(2,6-dicarboxyphenyl)phosphinic acid, bis(3,4-dicarboxyphenyl)phosphinic acid, bis(3,5-dicarboxyphenyl)phosphinic acid, bis(2,3,4-tricarboxyphenyl)phosphinic acid, bis(2,3,5-tricarboxyphenyl)phosphinic acid, bis(2,3,6-tricarboxyphenyl)phosphinic acid, bis(2,4,5-tricarboxyphenyl)phosphinic acid, bis(2,4,6-tricarboxyphenyl)phosphinic acid, methylphosphinic acid methyl ester, dimethylphosphinic acid methyl ester, methylphosphinic acid ethyl ester, dimethylphosphinic acid ethyl ester, ethylphosphinic acid methyl ester, diethylphosphinic acid methyl ester, ethylphosphinic acid ethyl ester, diethylphosphinic acid ethyl ester, phenylphosphinic acid methyl ester, phenylphosphinic acid ethyl ester, phenylphosphinic acid phenyl ester, diphenylphosphinic acid methyl ester, diphenylphosphinic acid ethyl ester, diphenylphosphinic acid phenyl ester, benzylphosphinic acid methyl ester, benzylphosphinic acid ethyl ester, benzylphosphinic acid phenyl ester, bisbenzylphosphinic acid methyl ester, bisbenzylphosphinic acid ethyl ester, benzylphosphinic acid phenyl ester, etc.; phosphine oxide compounds, such as trimethylphosphine oxide, triethylphosphine oxide, tripropylphosphine oxide, triisopropylphosphine oxide, tributylphosphine oxide, triphenylphosphine oxide, etc.; and the like.

The intrinsic viscosity of each of the polyester (Z1) and the polyester (Z2) is, for example, 0.55 to 1.30, and preferably 0.65 to 1.20. When the intrinsic viscosity is 0.55 or more, not only it is possible to obtain a transparent amorphous multilayer preform before stretching but also a multilayer bottle obtained by stretching the preform has a satisfactory mechanical strength. In addition, when the intrinsic viscosity is 1.30 or less, the fluidity upon molding a preform is not impaired, and then the bottle molding is easy.

The outermost layer or innermost layer is mainly constituted of the polyester (Z1), but other thermoplastic resins or various additives may be blended into the polyester resin so long as the characteristic features of the present invention are not impaired. On that occasion, it is preferred that 90% by mass or more of the outermost layer or innermost layer is the polyester (Z1).

Examples of this thermoplastic resins include thermoplastic polyester resins other than the abovementioned polyester (Z1) including polyethylene terephthalic, etc., polyolefin-type resins, polycarbonates, polyacrylonitrile, polyvinyl chloride, polystyrene, and the like. In addition, examples of the additive include ultraviolet absorbers, oxygen absorbers, colorants, infrared absorbers (reheating additives) for accelerating heating of the preform and shortening a cycle time at the time of molding.

As described above, the phosphorus atom-containing compound (B2) is sometimes used as the polymerization co-catalyst for each of the polyesters (Z1) and (Z2). For that reason, a phosphorus component may be contained in each of the polyester (Z1) and the polyester (Z2).

Here, from the viewpoint of an effect for suppressing the generation of scorch, the phosphorus atom concentration (p2) of each of the polyester (Z1) and the polyester (Z2) is preferably 6.5 µmol/g or less.

In addition, an alkali metal component or an alkaline earth metal component is sometimes contained in each of the polyester (Z1) and the polyester (Z2). The reason is that a small amount of an alkali metal compound or an alkaline earth metal compound which is coexistent in the catalyst system at the time of polycondensation of a polyester as a second metal-containing compound (C2), may enhance the catalytic activity in addition to an effect for suppressing the formation of diethylene glycol. Accordingly, the alkali metal compound or alkaline earth metal compound may be contained in each of the polyester (Z1) and the polyester (Z2).

The total molar concentration (m2) of the alkali (earth) metal atoms contained in each of the polyester (Z1) and the polyester (Z2) is preferably 0.1 to 10.0 µmol/g, and more preferably 0.2 to 5.0 µmol/g from the viewpoint of suppressing the formation of a gel or scorch.

The same compound as the alkali metal compound (C0) which is used for the polyamide (X) may be used as the second metal-containing compound (C2), but the second metal-containing compound (C2) is not limited thereto, and other compounds may be used.

[Alkali Compound (A)]

The resin composition of the present invention is one in which an alkali compound (A) is blended from the viewpoint of preventing scorch generated at the time of molding processing into a multilayer bottle or the like.

A molded article obtained from the resin composition containing a polyamide and a polyester by molding process is excellent in properties and appearance immediately after starting to use a molding machine for the molding. However, with a long-term molding processing operation, the generation of scorch would increase, and therefore, the quality of the product would become instable. For example, in a bottle molding, if a resin composition remaining in the inside of a passage of a molding machine is deteriorated due to excessive heating to result in the scorch, the passage would be plugged, or the generated scorch would contaminate a product bottle, thereby reducing the quality of the bottle.

In addition, it is considered that in general, if a polyester is heated for a long period of time, alcohol and carboxylic acid components are generated due to hydrolysis, and the carboxylic acid promotes the deterioration of the polyamide, thereby possibly hastening the generation of scorch. On the other hand, although hydrolysis is generated in the polyamide (X) due to long-term heating, the amine component is generated at the same time with the generation of the carboxylic acid in the case of the polyamide (X), and therefore, the acid component scarcely becomes excessive.

On the other hand, on the occasion of forming a resin composition by melt kneading a resin mixture composed of a polyester and a polyamide according to the present invention by using a molding machine or the like, it is considered that the deterioration such as scorch, etc., would be generated by reacting a decomposition product generated from the polyester with the polyamide resin.

In the present invention, it is presumed that on the occasion of forming a resin composition by melt-kneading the resin mixture composed of a polyester and a polyamide, an acid component generated during molding of the resin composition, particularly the acid component originated from the polyester (Z2), is neutralized with adding the alkali compound (A) to delay the deterioration of the polyamide, resulting in suppressing the formation of scorch in the resin composition, accordingly.

Preferred specific examples of the alkali compound (A) which is used in the present invention include hydroxides, hydrides, alkoxides, carbonates, hydrogencarbonates, or carboxylates of alkali metals or alkaline earth metals, but are not particularly limited to these. Preferred specific examples of the alkali metal or alkaline earth metal include sodium, potassium, lithium, rubidium, cesium, magnesium, calcium, and the like.

Examples of the hydroxide of an alkali metal or alkaline earth metal include lithium hydroxide, sodium hydroxide, potassium hydroxide, rubidium hydroxide, cesium hydroxide, magnesium hydroxide, calcium hydroxide, and the like.

Examples of the hydride of an alkali metal or alkaline earth metal include lithium hydride, sodium hydride, potassium hydride, and the like.

As the alkali metal alkoxide or alkaline earth metal alkoxide, alkoxides having 1 to 4 carbon atoms are preferred, and examples thereof include sodium methoxide, potassium methoxide, lithium methoxide, magnesium methoxide, calcium methoxide, sodium ethoxide, potassium ethoxide, lithium ethoxide, magnesium ethoxide, calcium ethoxide, sodium t-butoxide, potassium t-butoxide, lithium t-butoxide, magnesium t-butoxide, calcium t-butoxide, and the like.

Examples of the carbonate or hydrogencarbonate of an alkali metal or alkaline earth metal include sodium carbonate, sodium bicarbonate, potassium carbonate, potassium bicarbonate, lithium carbonate, calcium carbonate, magnesium carbonate, sodium hydrogencarbonate, calcium hydrogencarbonate, and the like. Furthermore, anhydrous salts or hydrous salts thereof may be used.

As the carboxylate (carboxylic acid salt) of an alkali metal or alkaline earth metal, the carboxylates having 1 to 10 carbon atoms are preferred, and anhydrous salts or hydrous salts may be used. Specific examples of the carboxylic acid include linear saturated fatty acids, such as formic acid, acetic acid, propionic acid, butyric acid, valeric acid, caproic acid, enanthic acid, capric acid, pelargonic acid, lauric acid, myristic acid, palmitic acid, stearic acid, eicosanoic acid, behenic acid, montanic acid, triacontanoic acid, etc.; fatty acid derivatives, such as 12-hydroxystearic acid, etc.; aliphatic dicarboxylic acids, such as oxalic acid, fumaric acid, maleic acid, succinic acid, glutaric acid, adipic acid, pimelic acid, suberic acid, azelaic acid, sebacic acid, undecanoic diacid, dodecanoic diacid, etc.; hydroxy acids, such as glycolic acid, lactic acid, hydroxybutyric acid, tartaric acid, malic acid, citric acid, isocitric acid, mevalonic acid, etc.; aromatic carboxylic acids, such as benzoic acid, terephthalic acid, isophthalic acid, orthophthalic acid, pyromellitic acid, trimellitic acid, xylylenedicarboxylic acid, naphthalenedicarboxylic acid, etc.; and the like.

The alkali compound (A) which is used in the present invention may be used in a single kind of the compounds described above or in combination of two or more kinds thereof. Among those described above, the carboxylate of an alkali metal having 10 or less carbon atoms are preferred from the viewpoint of dispersibility in the polyamide (X) and the viewpoint of an effect for suppressing the scorch formation, and sodium acetate and sodium acetate trihydrate are more preferred from the viewpoints of economy and an effect for suppressing the scorch formation.

As described later, the alkali compound (A) is generally added after polycondensing the polyamide (X) or the polyester (Z2). However, at least a part thereof may be blended during the polycondensation or prior to the polycondensation so long as its balance with the phosphorus atom-containing compound (B0) is not lost; for example, the promotion of the amidation reaction of the phosphorus atom-containing compound (B0) is not largely suppressed. Examples of such an alkali compound (A) include the alkali metal compound (C0) and the second metal-containing compound (C2) as described above.

[Resin Composition]

The resin composition that constitutes the barrier layer in the present invention contains 40 to 99 parts by mass of the polyamide (X) and 1 to 60 parts by mass of the polyester (Z2) when defining a total mass of the polyamide (X) and the polyester (Z2) as 100 parts by mass and the alkali compound (A) is blended therein.

In the present invention, when the amount of the polyamide (X) is less than 40 parts by mass, there is a concern that the multilayer bottle may not keep excellent barrier properties. On the other hand, when the amount of the polyester (Z1) is less than 1 part by mass, delamination between layers is likely to be generated in the multilayer bottle.

In order to reduce the generation of delamination while keeping good barrier properties, it is preferred that the amount of the polyamide (X) is 50 to 99 parts by mass, and the amount of the polyester (Z2) is 1 to 50 parts by mass; and it is more preferred that the amount of the polyamide (X) is 50 to 98 parts by mass, and the amount of the polyester (Z2) is 2 to 50 parts by mass.

<Molar Concentration of Phosphorus Atoms>

At the time of producing the polyamide (X), as described above, the phosphorus atom-containing compound (B0) is used from the viewpoint of preventing coloration of the polyamide (X), and so on. In addition, the polyester (Z2) may also contain the phosphorus atom-containing compound (B2). Accordingly, the phosphorus component is contained in the resin composition, whereby processing stability at the time of melt molding can be increased.

In the present invention, a molar concentration P (μmol/g) of the phosphorus atoms contained per gram of the resin composition satisfies a relationship of the following formula (1).

$$0.01 \leq P \leq 6.5 \tag{1}$$

(In the formula (1), P represents a molar concentration (μmol/g) of phosphorus atoms contained per gram of the resin composition.)

When P is less than 0.01 μmol/g, the multilayer bottle may cause a poor appearance due to coloration originated from the polyamide. In addition, when P is more than 6.5 μmol/g, even if the alkali compound (A) is added, an excessive polymerization reaction cannot be suppressed, and there is a concern that scorch is generated.

From the viewpoints of preventing the occurrence of coloration more favorably and increasing processing stability at the time of melt molding, the molar concentration P of the phosphorus atoms is preferably 0.5 μmol/g or more, more preferably 1.6 μmol/g or more, and especially preferably 1.9 μmol/g or more. In addition, from the viewpoint of preventing the occurrence of scorch generated at the time of molding processing, the molar concentration P of the phosphorus atoms is preferably 5.8 μmol/g or less, and more preferably 4.9 μmol/g or less.

<Total Molar Concentration of Alkali (Earth) Metal>

In the present invention, the alkali compound (A), the alkali metal compound (C0) originated from the polyamide (X), the second metal-containing compound (C2) originated from the polyester (Z2), and the like are blended in the resin composition. Therefore, the resin composition contains the alkali metal atoms and/or the alkaline earth metal atoms.

In the present invention, the alkali metal atoms and/or the alkaline earth metal atoms are contained in the resin composition such that a sum "M" of values obtained by multiplying the molar concentration of alkali metal atoms and the molar concentration of alkaline earth metal atoms, each contained per gram of the resin composition by valences thereof, respectively (the sum "M" will be hereinafter also referred to as "total molar concentration M of the alkali (earth) metal") satisfies relationships of the following formulae (2) and (3).

$$3.2 \leq M \leq 73.1 \tag{2}$$

$$M \geq 29.2 - 0.218\alpha \tag{3}$$

(In the formulae (2) and (3), M represents a total molar concentration (μmol/g) of the alkali (earth) metal contained per gram of the resin composition; and a represents the parts by mass of the polyamide (X) contained in the resin composition.)

It is to be noted that as described above, an alkali (earth) metal salt may be contained as the phosphorus atom-containing compounds (B0) and (B2) used for the polyamide (X) and the polyester (Z2), respectively. In addition, the alkali metal compound (C0) and the second metal-containing compound (C2) may be blended in the polyamide (X) and the polyester (Z2), respectively, on the occasion of polycondensation or the like, as the need arises. In consequence, in the present invention, the alkali (earth) metal atoms on the occasion of determining M also contains, in addition to the alkali compound (A), these compounds (B0), (B2), (C0), and (C2). That is, the "M" is a sum of values obtained by multiplying the molar concentrations of all alkali metal atoms and alkaline earth metal atoms each contained per gram of the resin composition, by valences thereof, respectively.

In the present invention, when M is less than 3.2 µmol/g, there is a concern that deterioration is caused in the polyamide by heating of the resin composition, whereby scorch is formed in an early stage. On the other hand, when M is more than 73.1 µmol/g, there is a concern that not only molding failure is caused due to a lowering of viscosity, but also the alkali compound (A) is deposited due to coloration, whitening, foaming, or the like.

From these viewpoints, M is preferably 7.6 µmol/g or more, more preferably 10.5 µmol/g or more, and especially preferably 27.0 µmol/g or more. In addition, M is preferably 65.0 µmol/g or less, and more preferably 55.0 µmol/g or less. In the present invention, by allowing M to fall within the foregoing numerical value range, gelation to be caused at the time of molding processing may also be prevented.

In addition, as is clear from the formula (3), M varies depending upon the blending amount of the polyester (Z2) in terms of the numerical value range. Specifically, when the mass proportion a of the polyamide resin in the resin composition is smaller and the blending amount of the polyester (Z2) is higher, the total molar concentration M of the alkali (earth) metal should be made to be larger, and it is necessary to make the blending amount of the alkali compound (A) larger.

In general, when the blending amount of the polyester (Z2) in the resin composition is larger, a lot of the carboxylic acid component originated from the polyester (Z2) is generated due to heating at the time of molding, or the like, thereby deteriorating the polyamide. In particular, as for the generation of scorch, it is considered that the deteriorated matter is likely to partially remain in the inside of the molding apparatus, and when the remaining deteriorated matter is overheated the flow in the remaining portion gets worse, resulting in finally causing scorch. With generating the scorch, the contamination thereof into the bottle is increased, whereby the quality of the product may become instable, or the apparatus should be stopped, thereby deteriorating the production efficiency. In the present invention, as expressed by the formula (3), by determining the blending amount of M depending upon the blending amount of the polyester (Z2), the carboxylic acid component that is generated depending upon the blending amount of the polyester (Z2) is appropriately neutralized, whereby, the generation of scorch as well as the deterioration of the polyamide can be delayed.

In consequence, in the present invention, with melting the resin composition satisfying the foregoing formula (3) and molding it, retention of the polyamide resin is suppressed in the inside of an apparatus, namely a screw or the inside of an extruder, the inside of a die, or a passage of the molten resin in a hot runner or the like. Then, the polyamide resin is freed from an excessive thermal history, and the generation of scorch can be suppressed.

In addition, in the present invention, in order to suppress the generation of scorch more favorably, it is preferred that M satisfies the following formula (3').

$$M \leq 33.2 - 0.218\alpha \tag{3'}$$

In the resin composition, one or plural other resins, such as nylon 6, nylon 66, nylon 66,6, polyester resins other than the polyester (Z2), polyolefins, phenoxy resins, etc. may be blended so long as the purpose is not impaired. In addition, inorganic fillers, such as glass fibers, carbon fibers, etc.; tabular inorganic fillers, such as glass flakes, talc, kaolin, mica, montmorillonite, organification-treated clays, etc.; impact resistant modifying materials, such as various elastomers, etc.; crystal nucleus agents; lubricants, such as fatty acid amide compounds, fatty acid amide compounds, etc.; antioxidants, such as copper compounds, organic or inorganic halogen compounds, hindered phenol-type antioxidants, hindered amine-type antioxidants, hydrazine-type antioxidants, sulfur compounds, phosphorus compounds, etc.; coloring inhibitors; UV absorbers, such as benzotriazole-type UV absorbers, etc.; additives, such as mold releasing agents, plasticizers, colorants, flame retardants, etc.; and additives, such as compounds containing cobalt metal, a benzoquinone, an anthraquinone, or a naphthoquinone, that is a compound capable of giving an oxygen scavenging ability, etc. may be blended in the composition.

[Production Method of Resin Composition]

The resin composition can be produced by a method including the following steps (a) and (b).

Step (a): A step of subjecting the diamine containing 70 mol % or more of m-xylylenediamine and the dicarboxylic acid to polycondensation in the presence of the phosphorus atom-containing compound (B0), to obtain the polyamide (X).

Step (b): A step of blending the alkali compound (A) and the polyester (Z2) with the polyamide (X) obtained in the step (a).

<Step (a)>

The step (a) is a step of subjecting the diamine containing 70 mol % or more of m-xylylenediamine and the dicarboxylic acid to polycondensation in the presence of the phosphorus atom-containing compound (B0), to obtain the polyamide (X). By polycondensing the polyamide (X) in the presence of phosphorus atom-containing compound (B0), the processing stability at the time of melt molding can be increased, and the coloration of the polyamide (X) can be prevented.

The production method of the polyamide (X) is not particularly limited so long as it is conducted in the presence of the phosphorus atom-containing compound (B0), and it can be conducted by an arbitrary method under an arbitrary polymerization condition. For example, the polyamide (X) may be produced by subjecting a nylon salt composed of a diamine component (for example, m-xylylenediamine) and a dicarboxylic acid component (for example, adipic acid) to raising temperature in the presence of water in a pressurized state and polymerizing it in a molten state while removing added water and condensed water.

In addition, the polyamide (X) may also be produced by a method of adding a diamine component (for example, m-xylylenediamine) directly to a dicarboxylic acid component (for example, adipic acid) in a molten state and polycondensing these at atmospheric pressure. In this case, in order to keep the reaction system in a uniform liquid state, the diamine component is continuously added to the dicarboxylic acid component, and meanwhile, the polycondensation is advanced while subjecting the reaction system to raising temperature such that the reaction temperature does not fall below melting points of the oligoamide and polyamide formed.

At the time of polycondensation of the polyamide (X), a small amount of a monoamine or a monocarboxylic acid may be added as a molecular weight modifier.

In addition, after the polyamide (X) is produced by the melt polymerization method, it may be subjected to solid phase polymerization, thereby conducting polycondensation. The solid phase polymerization is not particularly limited, and it can be conducted by an arbitrary method under an arbitrary polymerization condition.

In addition, as described above, it is preferred that the polycondensation of the polyamide (X) is conducted in the presence of the alkali metal compound (C0) in addition to the phosphorus atom-containing compound (B0).

<Step (b)>

The step (b) is a step of blending the polyester (Z2) and the alkali compound (A) with the polyamide (X) obtained in the step (a).

As described above, the examples of the alkali compound (A) include the same compound as the alkali metal compound (C0) or (C2) which may be added on the occasion of producing the polyamide (X) or the polyester (Z2). Therefore, it might be considered to add the alkali metal compound (C0) in excess at the time of melt polymerizing a polyamide, for example. However, there is a concern that the excessive addition of the alkali metal compound (C0) suppresses an effect for promoting the amidation reaction of the phosphorus atom-containing compound (B0) and delays the progress of the polycondensation, and the thermal history at the time of polyamide production might be increased, thereby causing scorch on the occasion of molding processing of a resin composition. For that reason, in the present invention, as compared with the case of increasing the amount of the alkali metal compound (C0) that is added when the polyamide (X) is obtained by melt polymerization from the monomer, the formation of scorch at the time of molding processing can be effectively prevented in the case of adding the alkali compound (A) in the step (b).

The blending amount of the alkali compound (A) that is added in the step (b) is the amount at which the total molar concentration M of the alkali (earth) metal atoms contained per gram of the resin composition falls within the foregoing range.

A method of blending the alkali compound (A) and the polyester (Z2) with the polyamide (X) is not particularly limited and can be conducted according to an arbitrary method; however, it is preferred that the polyamide (X), the alkali compound (A), and the polyester (Z2) are dry-blended and fed into an extruding machine or an injection molding machine.

In order to prevent separation of the polyester (Z2) and the polyamide (X) after dry-blending from the alkali compound (A), a viscous liquid may be attached as a spreader to the polyamide (X), followed by adding and mixing the alkali compound (A). The spreader is not particularly limited, and surfactants and the like can be used.

In addition, so long as the alkali compound (A) can be uniformly dispersed or completely dissolved in the resin composition, its form is not limited. The alkali compound (A) may be added itself, may be added after being heated and melted, or may be added after being dissolved in a solvent. In the case of adding a powder itself, for the purpose of suppressing the generation of an undissolved alkali compound in a molded article, its average particle diameter is preferably 0.001 mm to 5.0 mm, and more preferably 0.002 to 3.0 mm. In the case of adding the alkali compound (A) after being dissolved in a solvent, the resultant may be added in an extruding machine by using an apparatus, such as a feeder for liquid addition, etc., or may be previously blended by a tumbler or the like. Water or an arbitrary organic solvent can be used as the solvent.

The polyamide (X), the polyester (Z2), and the alkali compound (A) may be directly mixed and kneaded at the time of molding processing. In addition, the polyamide (X) and/or the polyester (Z2) may be melt kneaded together with the high-concentration of the alkali compound (A) using an extruding machine or the like, to prepare pellets, which are then blended with the polyamide (X) and/or the polyester (Z2) and subjected to molding processing. Alternatively, the pellets may also be blended with polyamide (X) and/or the polyester (Z2) and subjected to solid phase polymerization, followed by subjecting to molding processing.

In the case of using an extruding machine on the occasion of producing pellets having the high-concentration of the alkali compound (A), arbitrary extruding machines, such as a batch-type kneading machine, a kneader, a cokneader, a planetary extruding machine, a single-screw or twin-screw extruding machine, etc., can be used. Among those, from the viewpoints of kneading ability and productivity, a single-screw extruding machine and a twin-screw extruding machine are preferably used. Though means for feeding the polyamide (X) and/or the polyester (Z2) and the alkali compound (A) into the extruding machine are not particularly limited, a belt feeder, a screw feeder, a vibration feeder, and the like may be used. The polyamide (X), the polyester (Z2), and the alkali compound (A) may be respectively fed using a single feeder, or may be fed after being dry-blended.

In addition, in the step (b), the blending ratio of a total sum of the polyamide (X) and the alkali compound (A) relative to the polyester resin in the resin composition (polyester (Z2))/((polyamide (X))+(alkali compound (A))) is preferably 55/45 to 0.5/99.5, more preferably 51/49 to 1/99, still more preferably 50/50 to 2/98, and especially preferably 50/50 to 3/97 in terms of a mass ratio.

In addition, as for the production method of the resin composition, it is preferred that the step (b) includes the following step (b1) and the following step (b2) to be subsequently conducted.

Step (b1): A step of melt kneading 65 to 99.5 parts by mass of the polyamide (X) and 0.5 to 35 parts by mass of the alkali compound (A) by an extruding machine, to obtain a polyamide (Y).

Step (b2): A step of melt kneading 0.1 to 20 parts by mass of the polyamide (Y) obtained in the step (b1), 98.9 to 30 parts by mass of the polyamide (X), and 1 to 50 parts by mass of the polyester (Z2) in such a way that the total amount thereof is adjusted to 100 parts by mass.

According to this method, the polyamide (X) and the alkali compound (A) are melt kneaded by an extruding machine, to obtain the polyamide (Y) having the high-concentration of the alkali compound (A), and the obtained polyamide (Y) is then blended with the polyamide (X) and the polyester (Z2), followed by melt kneading to obtain a resin composition.

A form of the polyamide (Y) of present invention is preferably any one of a pellet form, a powder form, and a flake form, and the pellet form is especially preferred because of excellent handling properties.

In the step (b1), the blending ratio of the polyamide (X) and the alkali compound (A) ((polyamide (X))/(alkali compound (A))) is preferably 65/35 to 99.5/0.5, more preferably 70/30 to 98/2, and still more preferably 88/12 to 96/4 in terms of a mass ratio, from the viewpoint of suppressing a lowering of viscosity and the viewpoint of suppressing the formation of scorch and coloration.

In addition, in the step (b2), the blending ratio of the polyamide (Y) and the polyamide (X) ((polyamide (Y))/(polyamide (X))) is preferably 0.1/99.9 to 20/80, more preferably 0.5/99.5 to 15/85, still more preferably 1/99 to 10/90, and most preferably 2/98 to 5/95 in terms of a mass ratio, from the viewpoint of moldability and the viewpoint of suppressing the formation of scorch.

[Multilayer Bottle]

In order to prevent the occurrence of scorch generated at the time of molding processing, the multilayer bottle of the present invention is one in which a resin composition which contains the polyamide (X) and the polyester (Z2) and in which the alkali compound (A) is blended is used as the barrier layer.

In the present invention, even if the resin composition of the polyamide (X) and the polyester (Z2) remains and is heated in the inside of the apparatus, due to the addition of the alkali compound (A), a deteriorated matter is scarcely formed. For that reason, it is presumed that in view of the fact that the resin flow is kept well in the inside of the apparatus, overheating of the resin composition within the apparatus is prevented, and as a result, the generation of scorch is suppressed.

The multilayer bottle of the present invention is, for example, obtained by using an injection molding machine having two injection cylinders, injecting the polyester resin from the injection cylinder on the skin side and the resin composition from the injection cylinder from the core side, respectively through respective die hot runners into a die cavity, thereby obtaining a multilayer preform, and further subjecting the multilayer preform to biaxial stretch blow molding by a known method.

Alternatively, the multilayer bottle of the present invention is obtained by using a blow molding machine equipped with two extruding machines, melt extruding the polyester resin from the extruding machine on the skin side and the resin composition from the extruding machine on the core side, respectively in cylindrical forms, followed by intermittently conducting blow molding.

In general, as a method of blow molding the multilayer preform that is a precursor, there are conventionally known methods, such as a so-called cold parison method or hot parison method, etc. Specifically, there is a method in which after heating the surface of the multilayer preform at 80 to 120° C., the heated preform is stretched in the axial direction by mechanical means, such as pushing with a core rod insert, and subsequently, high-pressure air of generally 2 to 4 MPa is blown to transversely stretch the resultant, thereby undergoing blow molding. In addition, there is a method in which a mouth portion of the multilayer preform is crystallized, the surface is heated at 80 to 120° C., and the resultant is then subjected to blow molding within a die at 90 to 150° C.

In the present invention, the heating temperature of the preform is preferably 90 to 110° C., and more preferably 95° C. to 108° C. When the heating temperature of the preform is 90° C. or higher, the heating becomes sufficient, so that whitening of the barrier layer or the polyester layer to be caused due to cold stretching is prevented. When the heating temperature of the preform is 110° C. or lower, whitening of the barrier layer to be caused due to crystallization is prevented, and the durability against delamination between layers is likely to be made good.

In the present invention, it is preferred that the multilayer bottle has a three-layer structure of polyester resin layer/barrier layer/polyester resin layer, or a five-layer structure of polyester resin layer/barrier layer/polyester resin layer/barrier layer/polyester resin layer, because of excellent barrier properties and moldability, and so on. In addition, an adhesive resin layer may be provided between the layers, as the need arises.

The multilayer bottle having a three-layer structure or five-layer structure is obtained by subjecting a multilayer preform having a three-layer structure or five-layer structure to biaxial stretch blow molding by a known method. A production method of the multilayer preform having a three-layer structure or five-layer structure is not particularly limited, and a known method can be utilized. For example, in a step of injecting the polyester resin constituting each of the innermost layer and the outermost layer from the skin-side injection cylinder and injecting the resin constituting the barrier layer from the core-side injection cylinder, the polyester resin is first injected, and subsequently, the resin constituting the barrier layer and the polyester resin are simultaneously injected; and subsequently, a necessary amount of the polyester resin is injected to fill a die cavity, whereby the multilayer preform having a three-layer structure (polyester resin layer/barrier layer/polyester resin layer) can be produced.

In addition, in a step of injecting the polyester resin constituting each of the innermost layer and the outermost layer from the skin-side injection cylinder and injecting the resin constituting the barrier layer from the core-side injection cylinder, the polyester resin is first injected, and subsequently, the resin constituting the barrier layer is injected singly; and finally, the polyester resin is injected to fill a die cavity, whereby a multilayer preform having a five-layer structure (polyester resin layer/barrier layer/polyester resin layer/barrier layer/polyester resin layer) may be produced.

It is to be noted that the method of producing the multilayer preform is not limited only to the methods described above.

In the multilayer bottle, a thickness of the polyester resin layer is preferably 0.01 to 1.0 mm, and a thickness of the barrier layer is preferably 0.005 to 0.2 mm (5 to 200 µm). In addition, a thickness of the multilayer bottle is not necessarily constant over the whole of the bottle, and it is generally in the range of from 0.2 to 1.0 mm.

In the multilayer bottle obtained by subjecting the multilayer preform to biaxial stretch blow molding, so long as the barrier layer is existent at least in a barrel portion of the multilayer bottle, a gas barrier performance can be exhibited. However, in the case where the barrier layer extends up to near a tip end of a mouth portion of the multilayer bottle, the gas barrier properties are more favorable.

In the multilayer bottle of the present invention, a mass of the barrier layer is preferably 1 to 20% by mass, more preferably 2 to 15% by mass, and especially preferably 3 to 10% by mass relative to a total mass of the multilayer bottle. When the mass of the barrier layer falls within the foregoing range, not only a multilayer bottle having good gas barrier properties is obtained, but also molding from the multilayer preform that is a precursor into a multilayer bottle is easy.

In the multilayer bottle of the present invention, a contamination of scorch into a product is scarce. The multilayer bottle of the present invention is suitable for storage or preservation of various products, for example, liquid beverages, such as carbonated beverages, juices, water, milk, Japanese sake, whisky, distilled spirits, coffee, tea, jelly beverages, health beverages, etc., seasonings, such as seasoning liquids, sauces, soy sauces, dressings, liquid stocks, etc., liquid foods, such as liquid soups, etc., liquid medicines, toilet water, milky lotions, hairdressings, hair dyes, shampoos, and the like. In the multilayer bottle of the present invention, the generation of scorch at the time of production is scarce, plugging of a passage of the inside of the molding machine to be caused due to scorch is prevented, and the time for maintenance of the apparatus is reduced, and therefore, the present invention can contribute to the stable production of a multilayer bottle.

EXAMPLES

The present invention is hereinafter described in more detail by reference to Examples and Comparative Examples, but it should not be construed that the present invention is limited to these Examples. It is to be noted that the measurements for evaluations in the present invention were conducted by the following methods.
(1) Number of Scorch Generation:
An injection molding was conducted to form a three-layer preform (27 g) made of polyester layer/barrier layer/polyester layer with 2,500-shot thereby obtaining 10,000 preforms. Among the obtained preforms, the number of scorch-containing preforms was counted.
(2) Stability of Preform (PFM):
Whether or not the barrier layer was stably existent in the preform was determined through visual inspection. Four preforms obtained through one-cycle injection were cut in the longitudinal direction, and iodine tincture was coated on the cross section in order to dye only the resin composition layer (barrier layer), thereby confirming whether or not the positions of the barrier layers of the four preforms were uniform. In the case where the barrier layers are not stably existent, the positions of the barrier layers in a neck portion of the preform are varied, so that the quality of the resulting product is deteriorated.
(3) Metering Time:
In the cylinder for melting and injection molding the resin composition at the time of preform molding, a time required for metering a prescribed amount of the resin composition was measured. The fact that the metering time is excessively long means that the moldability is poor.
(4) Oxygen Transmission Rate (OTR):
OTR of the barrier layer of the multilayer bottle was measured in an atmosphere at 23° C. and a relative humidity of 60% in conformity with ASTM D3985. For the measurement, OX-TRAN 10/50A, manufactured by Modern Controls Corp was used. It is to be noted that the OTR of the barrier layer was measured by carefully breaking up the bottle and taking out only the barrier layer of a barrel portion. It is to be noted that when it is difficult to take out only the barrier layer, the OTR of a multilayer bottle piece taken out from the bottle barrel portion is measured; thereafter, a thickness of each layer is measured using a microscope or the like; and an OTR value of only the barrier layer can be calculated by utilizing the already-known OTR value of the polyester layer constituting each of the outermost layer and the innermost layer. In addition, the OTR of the barrier layer may also be calculated from a surface area of the multilayer bottle, the thickness of each layer, and the already-known OTR value of the polyester layer constituting each of the outermost layer and the innermost layer, after measuring the OTR of the multilayer bottle.
(5) Height of Delamination:
The multilayer bottle was charged with 500 mL of water and capped, and then allowed to stand still at 5° C. for 24 hours. A height of delamination (minimum drop distance at which the delamination occurs) was determined by a drop test of the bottle as described below on the basis of ASTM D2463-95 Procedure B.

First of all, the multilayer bottle was filled with water and capped, and the multilayer bottle was then vertically dropped such that a bottom portion thereof was impinged against a floor, thereby determining the presence or absence of delamination through visual inspection. It is to be noted that a drop height interval was 15 cm, and the number of tested bottles was 30.
(6) Total Molar Concentration (m0) of Alkali (Earth) Metal Atoms and Molar Concentration (p0) of Phosphorus Atoms in Polyamide (X), and Total Molar Concentration (m1) of Alkali (Earth) Metal Atoms and Molar Concentration (p1) of Phosphorus Atoms in Master Batch (Y):

For the measurement of these molar concentrations m0, p0, m1, and p1, in the polyamide (X) or the master batch (Y) was subjected to a decomposition treatment in nitric acid with a microwave and then quantitatively determined by using an atomic absorption spectrometer (trade name: AA-6650, manufactured by Shimadzu Corporation) and an ICP emission spectrometer (trade name: ICPE-9000, manufactured by Shimadzu Corporation). It is to be noted that the measured values were obtained in terms of a weight fraction (ppm), and therefore, m0, p0, m1, and p1 were calculated by using the atomic weights and the valences.
(7) Total Molar Concentration (m2) of Alkali (Earth) Metal Atoms and Molar Concentration (p2) of Phosphorus Atoms in Polyester Resin (Z2):

Similar to the polyamide (X), for the measurement of these molar concentrations m2 and p2, the quantitative determination was conducted by using an ICP emission spectrometer (trade name: ICPE-9000, manufactured by Shimadzu Corporation). It is to be noted that the measured values were obtained in terms of a weight fraction (ppm), and therefore, m2 and p2 were calculated by using the atomic weights and the valences.
(8) Total Molar Concentration (M) of Alkali (Earth) Metal Atoms and Molar Concentration (P) of Phosphorus Atoms in Resin Composition:

For the measurement of the total molar concentration (M) of the alkali (earth) metal atoms and the molar concentration (P) of phosphorus atoms in the resin composition, the prepared preform was cut out to separate the barrier layer, a specimen of the cut out barrier layer was subjected to a decomposition treatment in nitric acid with a microwave and then quantitatively determined by using an atomic absorption spectrometer (trade name: AA-6650, manufactured by Shimadzu Corporation) and an ICP emission spectrometer (trade name: ICPE-9000, manufactured by Shimadzu Corporation). It is to be noted that the measured values were obtained in terms of a weight fraction (ppm), and therefore, M and P were calculated by using the atomic weights and the valences.
<Polyesters (Z1) and (Z2)>

A polyester (ZA) and a polyester (ZB) which were used for the polyesters (Z1) and (Z2) were as follows. It is to be noted that an intrinsic viscosity was measured in a mixed solvent of phenol/tetrachloroethane=6/4 (weight ratio) at 30° C.

(Polyester Resin (ZA))

Polyethylene terephthalate having an intrinsic viscosity of 0.75 (UNIPET RT543C, manufactured by Nippon Unipet Co., Ltd.)

Total molar concentration (m2) of alkali (earth) metal atoms: 0.4 µmol/g, phosphorus atom concentration (p2): 1.5 µmol/g (Polyester Resin (ZB))

Polyethylene terephthalate having 3 mol % of isophthalic acid copolymerized therewith and having an intrinsic viscosity of 0.83 (Polyclear 1101, manufactured by Indorama Corporation)

Total molar concentration (m2) of alkali (earth) metal atoms: 4.3 µmol/g, phosphorus atom concentration (p2): 0.3 µmol/g Production Example 1 (Polyamide (X))

A reaction vessel having a capacity of 50 liters, which was equipped with a stirrer, a partial condenser, a full condenser, a thermometer, a dropping funnel, a nitrogen introducing tube, and a strand die, was charged with 15,000 g (102.6 moles) of precisely weighed adipic acid, 432.6 mg (4.082 mmoles, 5 ppm in terms of a phosphorus atom concentration in the polyamide) of sodium hypophosphite monohydrate ($NaH_2PO_2 \cdot H_2O$), and 234.3 mg (2.856 mmoles, 0.70 in terms of a molar number ratio relative to sodium hypophosphite monohydrate) of sodium acetate, and sufficiently substituted with nitrogen, and then the vessel was heated up to 170° C. while stirring the inside of the system under a small amount of a nitrogen stream. 13,896 g (102.0 moles) of m-xylylenediamine was added dropwise thereto while stirring, and the inside of the system was continuously subjected to raising temperature while removing formed condensed water to the outside of the system. After completion of the dropwise addition of m-xylylenediamine, the inner temperature was controlled to 260° C. to continue the reaction for 40 minutes. Thereafter, the inside of the system was pressurized with nitrogen, a polymer was taken out from the strand die, and this was pelletized to obtain about 24 kg of a polyamide.

Subsequently, the polyamide was charged in a jacket-equipped tumble dryer in which a nitrogen gas introducing tube, a vacuum line, a vacuum pump, and a thermocouple for measuring an inner temperature were provided, and the inside of the tumble dryer was sufficiently substituted with nitrogen having a purity of 99% by volume or more while rotating it at a fixed rate. Thereafter, the tumble dryer was heated under the same nitrogen gas stream, and the pellet temperature was elevated up to 150° C. over about 150 minutes. When the pellet temperature reached 150° C., a pressure in the system was reduced to 1 torr or less. The raising temperature was further continued, and after the pellet temperature was elevated up to 200° C. over about 70 minutes, the system was maintained at 200° C. for 30 to 45 minutes. Subsequently, a nitrogen gas having a purity of 99% by volume or more was introduced into the system, and the tumble dryer was cooled while rotating, thereby obtaining a polyamide (X1).

Production Examples 2 to 6 (Polyamide (X))

Polyamides (X2 to X6) were synthesized in the same manner as that in Production Example 1, except that the amounts of sodium hypophosphite monohydrate and sodium acetate were changed to those shown in Table 1. It is to be noted that the necessary amounts of polyamide resins in the following Examples and Comparative Examples were obtained by repeating the same production.

Production Example 7 (Master Batch (Y))

As shown in Table 2, 3,558 g of the polyamide (X1) and 1,442 g of sodium acetate were melt kneaded at 260° C. by using a twin-screw extruding machine, TEM37B, manufactured by Toshiba Corporation, thereby obtaining a master batch (Y1).

Production Examples 8 to 18 (Master Batch (Y))

Master batches (Y2 to Y12) were obtained in the same manner as that in Production Example 8, except that the kind of the polyamide (X), the charged amount of the polyamide, and the charged amount of sodium acetate were changed to those shown in Table 2.

TABLE 1

|  |  | $NaH_2PO_2 \cdot H_2O$ (mmole) | Sodium acetate (mmole) | Molar ratio |
|---|---|---|---|---|
| Production Example 1 | X1 | 4.082 | 2.856 | 0.7 |
| Production Example 2 | X2 | 123.541 | 83.193 | 0.7 |
| Production Example 3 | X3 | 77.023 | 37.937 | 0.5 |
| Production Example 4 | X4 | 8.883 | 4.375 | 0.5 |
| Production Example 5 | X5 | 193.902 | 95.504 | 0.5 |
| Production Example 6 | X6 | 275.717 | 135.801 | 0.5 |

TABLE 2

| | | Formulation | | | | | |
|---|---|---|---|---|---|---|---|
| | | Polyamide (X) | | | Sodium acetate | Master batch (Y) | |
| Master batch (Y) | Kind | m0[1] µmol/g | p0[2] µmol/g | Charged amount g | Charged amount g | m1[1] µmol/g | p1[2] µmol/g |
| Y1 | X1 | 0.26 | 0.16 | 3558 | 1442 | 3516 | 0.12 |
| Y2 | X1 | 0.26 | 0.16 | 4113 | 887 | 2164 | 0.13 |
| Y3 | X1 | 0.26 | 0.16 | 4423 | 577 | 1406 | 0.14 |
| Y4 | X1 | 0.26 | 0.16 | 4712 | 288 | 703 | 0.15 |
| Y5 | X1 | 0.26 | 0.16 | 4856 | 144 | 352 | 0.16 |
| Y6 | X1 | 0.26 | 0.16 | 4936 | 64 | 157 | 0.16 |
| Y7 | X2 | 8.2 | 4.9 | 3963 | 1037 | 2534 | 3.87 |
| Y8 | X2 | 8.2 | 4.9 | 4362 | 638 | 1563 | 4.26 |
| Y9 | X2 | 8.2 | 4.9 | 4585 | 415 | 1019 | 4.48 |
| Y10 | X2 | 8.2 | 4.9 | 4793 | 207 | 513 | 4.68 |

TABLE 2-continued

| | | Formulation | | | | | |
|---|---|---|---|---|---|---|---|
| | | Polyamide (X) | | | Sodium acetate | Master batch (Y) | |
| Master batch (Y) | Kind | m0[1] μmol/g | p0[2] μmol/g | Charged amount g | Charged amount g | m1[1] μmol/g | p1[2] μmol/g |
| Y11 | X2 | 8.2 | 4.9 | 4896 | 104 | 261 | 4.79 |
| Y12 | X2 | 8.2 | 4.9 | 4954 | 46 | 120 | 4.84 |

[1]Total molar concentration of alkali (earth) metal atoms per gram in polyamide (X) or master batch (Y)
[2]Molar concentration of phosphorus atoms per gram in polyamide (X) or master batch (Y)

Example 1

As shown in Table 3, 9,886 g of the polyamide (X1) obtained in Production Example 1, 10,000 g of the polyester resin (ZA), and 114.3 g of sodium acetate as the alkali compound (A) were dry-blended by a tumbler, thereby obtaining a resin mixture.

<Preparation of Three-Layer Preform>

For molding a three-layer preform, an injection molding machine having two injection cylinders (Model: M200), manufactured by Meiki Seisakusho Co., Ltd. and a die (four-shot molding type), manufactured by Kata Systems Company were used.

Then, the polyester resin (ZA) constituting each of the outermost layer and the innermost layer was charged in a material hopper provided above the skin-side injection cylinder. In addition, the resin mixture constituting the barrier layer was charged in a material hopper of the core-side injection cylinder. A temperature of each of the portions of the injection molding machine was set as follows.

Skin-side injection cylinder temperature: 280° C.
Core-side injection cylinder temperature: 290° C.
Resin passage temperature in die: 290° C.
Cooling water temperature in die: 15° C.
Proportion of resin composition constituting barrier layer in preform: 5% by mass
Cycle time: 40 seconds Subsequently, the polyester resin (ZA) which had been melted in the cylinder was injected from the skin-side injection cylinder, and a necessary amount of the resin composition obtained by similarly melting the resin mixture in the cylinder was injected from the core-side injection cylinder simultaneously with the polyester resin (ZA) to fill a cavity, thereby preparing a three-layer preform of polyester resin (ZA)/resin composition 1/polyester resin (ZA).

<Preparation of Multilayer Bottle>

The three-layer preform described above was subjected to biaxial stretch blow molding using a blow molding machine (Model: LB-01, manufactured by KRUPP CORPOPLAST) under the following condition, thereby obtaining a hollow container having a three-layer structure (e.g. three-layer bottle). The three-layer hollow container has a whole length of 223 mm, an outer diameter of 65 mmφ, and a capacity of 500 mL (surface area: 0.04 m$^2$), and its bottom shape is a petaloid type.

Parison heating temperature: 100° C.
Blow pressure: 3.0 MPa

A multilayer bottle (three-layer bottle) was produced from the resulting multilayer preform. Evaluation results of the resin composition 1, the three-layer preform, and the three-layer bottle of Example 1 are shown in Table 3.

It is to be noted that in each of the Examples and Comparative Examples, the parts by mass of the polyamide (X) and the polyester (Z2), the total molar concentration M (μmol %) of the alkali (earth) metal, and the molar concentration P (μmol %) of the phosphorus atoms in the resin composition are also shown in Tables 3 and 4.

Examples 2 to 21 and Comparative Examples 1 to 13

In Examples 2 to 14, Examples 16 to 21, and Comparative Example 1 to 13, the same procedures as those in Example 1 were followed, except that the blending amount and kind of each of the polyamide (X) and the polyester (Z2) were changed, and the blending amount of the alkali compound (A) (sodium acetate) was changed. In addition, in Example 15, the same procedures as those in Example 1 were followed, except that the formulation of the resin composition was changed as shown in Table 1 and the polyester (ZB) was used as the polyester (Z2) for each of the outermost layer and the innermost layer. Evaluation results of the resin composition, the three-layer preform, and the three-layer bottle of each of the Examples and Comparative Examples are shown in Tables 3 and 4.

TABLE 3

| | Polyamide (X) | | | | | Polyester resin (Z2) | | | | |
|---|---|---|---|---|---|---|---|---|---|---|
| | | m0[1] | p0[2] | Charged amount | | | m2[1] | p2[2] | Charged amount | |
| | Kind | μmol/g | μmol/g | g | Parts by mass | Kind | μmol/g | μmol/g | g | parts by mass |
| Example 1 | X1 | 0.26 | 0.16 | 9886 | 49.7 | ZA | 0.4 | 1.5 | 10000 | 50.3 |
| Example 2 | X1 | 0.26 | 0.16 | 9919 | 49.8 | ZA | 0.4 | 1.5 | 10000 | 50.2 |
| Example 3 | X1 | 0.26 | 0.16 | 9951 | 49.9 | ZA | 0.4 | 1.5 | 10000 | 50.1 |
| Example 4 | X1 | 0.26 | 0.16 | 9969 | 49.9 | ZA | 0.4 | 1.5 | 10000 | 50.1 |
| Example 5 | X2 | 8.2 | 4.9 | 9892 | 49.7 | ZA | 0.4 | 1.5 | 10000 | 50.3 |
| Example 6 | X2 | 8.2 | 4.9 | 9925 | 49.8 | ZA | 0.4 | 1.5 | 10000 | 50.2 |
| Example 7 | X2 | 8.2 | 4.9 | 9976 | 49.9 | ZA | 0.4 | 1.5 | 10000 | 50.1 |
| Example 8 | X1 | 0.26 | 0.16 | 19686 | 99.0 | ZA | 0.4 | 1.5 | 200 | 1.0 |
| Example 9 | X1 | 0.26 | 0.16 | 19718 | 99.0 | ZA | 0.4 | 1.5 | 200 | 1.0 |

TABLE 3-continued

| | | | | | | | | | | |
|---|---|---|---|---|---|---|---|---|---|---|
| Example 10 | X1 | 0.26 | 0.16 | 19751 | 99.0 | ZA | 0.4 | 1.5 | 200 | 1.0 |
| Example 11 | X1 | 0.26 | 0.16 | 19784 | 99.0 | ZA | 0.4 | 1.5 | 200 | 1.0 |
| Example 12 | X2 | 8.2 | 4.9 | 19698 | 99.0 | ZA | 0.4 | 1.5 | 200 | 1.0 |
| Example 13 | X2 | 8.2 | 4.9 | 19731 | 99.0 | ZA | 0.4 | 1.5 | 200 | 1.0 |
| Example 14 | X2 | 8.2 | 4.9 | 19797 | 99.0 | ZA | 0.4 | 1.5 | 200 | 1.0 |
| Example 15 | X4 | 0.52 | 0.35 | 13970 | 70.0 | ZB | 4.3 | 0.3 | 6000 | 30.0 |
| Example 16 | X5 | 11.4 | 7.7 | 13981 | 70.0 | ZA | 0.4 | 1.5 | 6000 | 30.0 |
| Example 17 | X2 | 8.2 | 4.9 | 13895 | 69.8 | ZA | 0.4 | 1.5 | 6000 | 30.2 |
| Example 18 | X2 | 8.2 | 4.9 | 13928 | 69.9 | ZA | 0.4 | 1.5 | 6000 | 30.1 |
| Example 19 | X2 | 8.2 | 4.9 | 13964 | 69.9 | ZA | 0.4 | 1.5 | 6000 | 30.1 |
| Example 20 | X2 | 8.2 | 4.9 | 13987 | 70.0 | ZA | 0.4 | 1.5 | 6000 | 30.0 |
| Example 21 | X1 | 0.26 | 0.16 | 8968 | 44.9 | ZA | 0.4 | 1.5 | 11000 | 55.1 |
| Comparative Example 1 | X1 | 0.26 | 0.16 | 9869 | 49.7 | ZA | 0.4 | 1.5 | 10000 | 50.3 |
| Comparative Example 2 | X1 | 0.26 | 0.16 | 10000 | 50.0 | ZA | 0.4 | 1.5 | 10000 | 50.0 |
| Comparative Example 3 | X2 | 8.2 | 4.9 | 9876 | 49.7 | ZA | 0.4 | 1.5 | 10000 | 50.3 |
| Comparative Example 4 | X2 | 8.2 | 4.9 | 9981 | 50.0 | ZA | 0.4 | 1.5 | 10000 | 50.0 |
| Comparative Example 5 | X1 | 0.26 | 0.16 | 7460 | 37.4 | ZA | 0.4 | 1.5 | 12500 | 62.6 |
| Comparative Example 6 | X1 | 0.26 | 0.16 | 19968 | 100.0 | — | — | — | — | — |
| Comparative Example 7 | X4 | 0.52 | 0.35 | 19792 | 99.0 | ZA | 0.4 | 1.5 | 200 | 1.0 |
| Comparative Example 8 | X1 | 0.26 | 0.16 | 19669 | 99.0 | ZA | 0.4 | 1.5 | 200 | 1.0 |
| Comparative Example 9 | X1 | 0.26 | 0.16 | 19800 | 99.0 | ZA | 0.4 | 1.5 | 200 | 1.0 |
| Comparative Example 10 | X2 | 8.2 | 4.9 | 19682 | 99.0 | ZA | 0.4 | 1.5 | 200 | 1.0 |
| Comparative Example 11 | X3 | 4.5 | 3.0 | 19796 | 99.0 | ZA | 0.4 | 1.5 | 200 | 1.0 |
| Comparative Example 12 | X6 | 16.3 | 10.9 | 13986 | 70.0 | ZA | 0.4 | 1.5 | 6000 | 30.0 |
| Comparative Example 13 | X2 | 8.2 | 4.9 | 14000 | 70.0 | ZA | 0.4 | 1.5 | 6000 | 30.0 |

| | Alkali compound (A) | | Resin composition | | | |
|---|---|---|---|---|---|---|
| | Charged amount (g) | Proportion in resin composition (% by mass) | M μmol/g | P μmol/g | Formula (3) 29.2-0.218α | Formula (3') 33.2-0.218α |
| Example 1 | 114.3 | 0.57 | 70.0 | 0.84 | 18.4 | 22.4 |
| Example 2 | 81.5 | 0.41 | 50.0 | 0.84 | 18.3 | 22.3 |
| Example 3 | 48.7 | 0.24 | 30.0 | 0.84 | 18.3 | 22.3 |
| Example 4 | 30.6 | 0.15 | 19.0 | 0.84 | 18.3 | 22.3 |
| Example 5 | 107.9 | 0.54 | 70.0 | 3.2 | 18.4 | 22.4 |
| Example 6 | 75.0 | 0.38 | 50.0 | 3.2 | 18.3 | 22.3 |
| Example 7 | 24.1 | 0.12 | 19.0 | 3.2 | 18.3 | 22.3 |
| Example 8 | 114.4 | 0.57 | 70.0 | 0.18 | 7.6 | 11.6 |
| Example 9 | 81.6 | 0.41 | 50.0 | 0.18 | 7.6 | 11.6 |
| Example 10 | 48.8 | 0.24 | 30.0 | 0.18 | 7.6 | 11.6 |
| Example 11 | 16.0 | 0.08 | 10.0 | 0.18 | 7.6 | 11.6 |
| Example 12 | 101.6 | 0.51 | 70.0 | 4.9 | 7.6 | 11.6 |
| Example 13 | 68.8 | 0.34 | 50.0 | 4.9 | 7.6 | 11.6 |
| Example 14 | 3.1 | 0.02 | 10.0 | 4.9 | 7.6 | 11.6 |
| Example 15 | 30.1 | 0.15 | 20.0 | 0.32 | 13.9 | 18.9 |
| Example 16 | 19.5 | 0.10 | 20.0 | 5.8 | 13.9 | 18.9 |
| Example 17 | 105.3 | 0.53 | 70.0 | 3.9 | 14.0 | 19.0 |
| Example 18 | 72.5 | 0.36 | 50.0 | 3.9 | 14.0 | 19.0 |
| Example 19 | 36.4 | 0.18 | 28.0 | 3.9 | 14.0 | 19.0 |
| Example 20 | 13.4 | 0.07 | 14.0 | 3.9 | 13.9 | 18.9 |
| Example 21 | 32.2 | 0.16 | 20.0 | 0.91 | 19.4 | 23.4 |
| Comparative Example 1 | 130.7 | 0.65 | 80.0 | 0.84 | 18.4 | 22.4 |
| Comparative Example 2 | — | — | 0.3 | 0.84 | 18.3 | 22.3 |
| Comparative Example 3 | 124.3 | 0.62 | 80.0 | 3.2 | 18.4 | 22.4 |
| Comparative Example 4 | 19.2 | 0.10 | 16.0 | 3.2 | 18.3 | 22.3 |
| Comparative Example 5 | 40.5 | 0.20 | 25.0 | 1.01 | 21.1 | 25.1 |
| Comparative Example 6 | 32.4 | 0.16 | 20.0 | 0.16 | 7.4 | 11.4 |
| Comparative Example 7 | 3.4 | 0.02 | 3.0 | 0.36 | 7.6 | 11.6 |
| Comparative Example 8 | 130.8 | 0.65 | 80.0 | 0.18 | 7.6 | 11.6 |
| Comparative Example 9 | — | — | 0.3 | 0.18 | 7.6 | 11.6 |
| Comparative Example 10 | 118.1 | 0.59 | 80.0 | 4.9 | 7.6 | 11.6 |
| Comparative Example 11 | 3.5 | 0.02 | 6.0 | 2.6 | 7.6 | 11.6 |
| Comparative Example 12 | 13.9 | 0.07 | 20.0 | 8.1 | 13.9 | 18.9 |
| Comparative Example 13 | — | — | 5.9 | 3.9 | 13.9 | 18.9 |

[1] Total molar concentration of alkali metal atoms and alkaline earth metal atoms per gram of polyamide (X) or polyester (Z)
[2] Molar concentration of phosphorus atoms per gram of polyamide (X) or polyester (Z)
It is to be noted that the symbol "—" in the table means "non-blended".

TABLE 4

| | Evaluation of preform | | Evaluation of bottle | |
| | | | OTR | |
| | Number of PFM scorch generation | Metering stability | Metering time sec | cc·mm/m²·day·atm | Height of delamination cm |
|---|---|---|---|---|---|
| Example 1 | 0 | Good | 12 | 0.10 | 330 |
| Example 2 | 0 | Good | 4 | 0.09 | 340 |
| Example 3 | 2 | Good | 4 | 0.09 | 340 |
| Example 4 | 6 | Good | 4 | 0.09 | 330 |
| Example 5 | 0 | Good | 12 | 0.09 | 330 |
| Example 6 | 0 | Good | 4 | 0.08 | 340 |
| Example 7 | 6 | Good | 4 | 0.09 | 330 |
| Example 8 | 1 | Good | 12 | 0.06 | 255 |
| Example 9 | 0 | Good | 4 | 0.05 | 255 |
| Example 10 | 2 | Good | 4 | 0.05 | 250 |
| Example 11 | 4 | Good | 4 | 0.05 | 250 |
| Example 12 | 1 | Good | 12 | 0.06 | 250 |
| Example 13 | 0 | Good | 4 | 0.05 | 260 |
| Example 14 | 4 | Good | 4 | 0.05 | 250 |
| Example 15 | 0 | Good | 4 | 0.07 | 330 |
| Example 16 | 5 | Good | 4 | 0.07 | 330 |
| Example 17 | 1 | Good | 12 | 0.07 | 335 |
| Example 18 | 2 | Good | 4 | 0.06 | 310 |
| Example 19 | 3 | Good | 4 | 0.07 | 320 |
| Example 20 | 6 | Good | 4 | 0.07 | 330 |
| Example 21 | 0 | Good | 4 | 0.11 | 330 |
| Comparative Example 1 | 0 | Disordered | 44 | 0.10 | 320 |
| Comparative Example 2 | 16 | Good | 4 | 0.09 | 325 |
| Comparative Example 3 | 0 | Disordered | 44 | 0.10 | 320 |
| Comparative Example 4 | 24 | Good | 4 | 0.09 | 340 |
| Comparative Example 5 | 0 | Good | 4 | 0.16 | 340 |
| Comparative Example 6 | 0 | Good | 4 | 0.05 | 220 |
| Comparative Example 7 | 22 | Good | 4 | 0.06 | 260 |
| Comparative Example 8 | 0 | Disordered | 32 | 0.05 | 255 |
| Comparative Example 9 | 17 | Good | 4 | 0.05 | 255 |
| Comparative Example 10 | 0 | Disordered | 32 | 0.06 | 280 |
| Comparative Example 11 | 22 | Good | 4 | 0.05 | 280 |
| Comparative Example 12 | 18 | Good | 4 | 0.07 | 320 |
| Comparative Example 13 | 34 | Good | 4 | 0.07 | 315 |

Example 22

13,888 g of the polyamide (X1), 6,000 g of the polyester resin (ZA), and 112 g of the master batch (Y1) were dry-blended by a tumbler, thereby obtaining a resin mixture. Then, a three-layer preform and a three-layer bottle were produced in the same manner as that in Example 1, except that the resulting resin mixture was charged in a material hopper of the core-side injection cylinder. Evaluation results of the resin composition, the three-layer preform, and the three-layer bottle of Example 22 are shown in Tables 5 and 6.

Examples 23 to 33

In Examples 23 to 33, the same procedures as those in Example 22 were followed, except for changing the formulation of the resin composition as shown in Table 5, thereby producing multilayer preforms and multilayer bottles. Evaluation results of the resin compositions, the three-layer preforms, and the three-layer bottles of Examples 23 to 33 are shown in Tables 5 and 6.

TABLE 5

| | Polyamide (X) | | | | Polyester (Z2) | | | |
|---|---|---|---|---|---|---|---|---|
| | Kind | m0[1] μmol/g | p0[2] μmol/g | Charged amount g | Kind | m2[2] μmol/g | p2[2] μmol/g | Charged amount g |
| Example 22 | X1 | 0.26 | 0.16 | 13888 | ZA | 0.4 | 1.5 | 6000 |
| Example 23 | X1 | 0.26 | 0.16 | 13818 | ZA | 0.4 | 1.5 | 6000 |
| Example 24 | X1 | 0.26 | 0.16 | 13720 | ZA | 0.4 | 1.5 | 6000 |
| Example 25 | X1 | 0.26 | 0.16 | 13440 | ZA | 0.4 | 1.5 | 6000 |
| Example 26 | X1 | 0.26 | 0.16 | 12880 | ZA | 0.4 | 1.5 | 6000 |
| Example 27 | X1 | 0.26 | 0.16 | 11480 | ZA | 0.4 | 1.5 | 6000 |
| Example 28 | X2 | 8.2 | 4.9 | 13888 | ZA | 0.4 | 1.5 | 6000 |
| Example 29 | X2 | 8.2 | 4.9 | 13818 | ZA | 0.4 | 1.5 | 6000 |
| Example 30 | X2 | 8.2 | 4.9 | 13720 | ZA | 0.4 | 1.5 | 6000 |
| Example 31 | X2 | 8.2 | 4.9 | 13440 | ZA | 0.4 | 1.5 | 6000 |
| Example 32 | X2 | 8.2 | 4.9 | 12880 | ZA | 0.4 | 1.5 | 6000 |
| Example 33 | X2 | 8.2 | 4.9 | 11480 | ZA | 0.4 | 1.5 | 6000 |

| | Master batch (Y) | | | Resin composition | | | | |
|---|---|---|---|---|---|---|---|---|
| | | | | Charged amount | Parts by mass | | M | P |
| | Kind | m1[1] μmol/g | p1[2] μmol/g | g | Polyamide | Polyester | μmol/g | Formula (3) | Formula (3') |
| Example 22 | Y1 | 3516 | 0.12 | 112 | 70.0 | 30.0 | 20.0 | 0.57 | 14.0 | 18.0 |
| Example 23 | Y2 | 2164 | 0.13 | 182 | 70.0 | 30.0 | 20.0 | 0.57 | 14.0 | 18.0 |
| Example 24 | Y3 | 1406 | 0.14 | 280 | 70.0 | 30.0 | 20.0 | 0.57 | 14.0 | 18.0 |
| Example 25 | Y4 | 703 | 0.15 | 560 | 70.0 | 30.0 | 20.0 | 0.57 | 14.0 | 18.0 |

TABLE 5-continued

| | | | | | | | | | | |
|---|---|---|---|---|---|---|---|---|---|---|
| Example 26 | Y5 | 352 | 0.16 | 1120 | 70.0 | 30.0 | 20.0 | 0.56 | 14.0 | 18.0 |
| Example 27 | Y6 | 157 | 0.16 | 2520 | 70.0 | 30.0 | 20.0 | 0.55 | 14.0 | 18.0 |
| Example 28 | Y7 | 2534 | 3.87 | 112 | 70.0 | 30.0 | 20.0 | 3.9 | 13.9 | 17.9 |
| Example 29 | Y8 | 1563 | 4.26 | 182 | 70.0 | 30.0 | 20.0 | 3.8 | 13.9 | 17.9 |
| Example 30 | Y9 | 1019 | 4.48 | 280 | 70.0 | 30.0 | 20.0 | 3.8 | 13.9 | 17.9 |
| Example 31 | Y10 | 513 | 4.68 | 560 | 70.0 | 30.0 | 20.0 | 3.7 | 13.9 | 17.9 |
| Example 32 | Y11 | 261 | 4.79 | 1120 | 70.0 | 30.0 | 20.0 | 3.6 | 13.9 | 17.9 |
| Example 33 | Y12 | 120 | 4.84 | 2520 | 70.0 | 30.0 | 20.0 | 3.3 | 13.9 | 17.9 |

[1] Total molar concentration of alkali (earth) metal atoms per gram of polyamide (X), polyester (Z2), or master batch (Y)
[2] Molar concentration of phosphorus atoms per gram of polyamide (X), polyester (Z2), or master batch (Y)

TABLE 6

| | Evaluation of preform | | | Evaluation of bottle | |
|---|---|---|---|---|---|
| | Number of PFM scorch generation | Metering stability | Metering time sec | OTR cc · mm/m² · day · atm | Height of delamination cm |
| Example 22 | 5 | Good | 4 | 0.07 | 335 |
| Example 23 | 3 | Good | 4 | 0.07 | 330 |
| Example 24 | 0 | Good | 4 | 0.08 | 315 |
| Example 25 | 0 | Good | 4 | 0.06 | 330 |
| Example 26 | 4 | Good | 4 | 0.07 | 340 |
| Example 27 | 5 | Good | 4 | 0.07 | 345 |
| Example 28 | 5 | Good | 4 | 0.06 | 335 |
| Example 29 | 3 | Good | 4 | 0.08 | 330 |
| Example 30 | 0 | Good | 4 | 0.08 | 315 |
| Example 31 | 0 | Good | 4 | 0.07 | 330 |
| Example 32 | 4 | Good | 4 | 0.07 | 340 |
| Example 33 | 5 | Good | 4 | 0.07 | 345 |

As is clear from the results of the Examples and Comparative Examples, when the resin composition constituting the barrier layer satisfies the formulae (1) to (3) while containing fixed amounts of the polyamide (X) and the polyester (Z2), the generation of scorch of the multilayer bottle could be reduced, and the molding processability could be made good. In addition, the resulting multilayer bottles were high in durability against the delamination and good in barrier properties.

On the other hand, in Comparative Examples 1, 3, 8, and 10, in which the value of the total molar concentration (M) of the alkali (earth) metal atoms in the resin composition is larger than the upper limit value of the formula (2), the PFM stability and the metering time were not good, and hence the moldability was not good. In addition, in Comparative Example 2, 7, and 9, in which the value of M is smaller than the lower limit value of the formula (2), the generation of scorch could not be reduced. In addition, even in Comparative Examples 4, 11, and 13, in which while the values of M and P satisfy the formulae (1) and (2), respectively, the formula (3) is not satisfied, the generation of scorch could not be reduced. Furthermore, in Comparative Example 12, in which the blending amount of the phosphorus atoms is too large, so that P does not satisfy the formula (2), the generation of scorch could not be similarly suppressed.

In addition, in Comparative Example 5, in which the blending amount of the polyamide in the resin composition is small, the barrier performance of the resulting bottle was low. In addition, in Comparative Example 6, in which the polyester is not blended in the resin composition, the durability against delamination was low. In the light of the above, in any of Comparative Examples 1 to 13, multilayer bottles having desired performances could not be obtained.

The invention claimed is:

1. A multilayer bottle comprising: an outermost layer and an innermost layer; and at least one barrier layer located between the outermost layer and the innermost layer,
   wherein the outermost layer and the innermost layer are each composed of a polyester (Z1),
   the barrier layer is composed of a resin composition containing 40 to 99 parts by mass of a polyamide (X) comprising a diamine unit containing 70 mol % or more of a m-xylylenediamine unit and a dicarboxylic acid unit and 1 to 60 parts by mass of a polyester (Z2) provided that a total sum of the polyamide (X) and the polyester (Z2) is 100 parts by mass,
   the polyester (Z1) and the polyester (Z2) each comprise a dicarboxylic acid unit containing 80 mol % or more of a terephthalic acid unit and a diol unit containing 80 mol % or more of an ethylene glycol unit,
   the polyamide (X) is a polyamide comprising a diamine unit containing 70 mol % or more of a m-xylylenediamine unit and a dicarboxylic acid unit containing 70 mol % or more of an adipic acid unit,
   an alkali compound (A) which is at least one selected from a carboxylate of an alkali metal having 10 or less carbon atoms is blended in the resin composition, and
   the resin composition further satisfies the following formulae (1) to (3):

$$0.01 \leq P \leq 6.5 \quad (1)$$

$$3.2 \leq M \leq 73.1 \quad (2)$$

$$M \geq 29.2 - 0.218\alpha \quad (3)$$

wherein P represents a molar concentration (μmol/g) of phosphorus atoms contained per gram of the resin composition; M represents a sum of values (μmol/g) obtained by multiplying the molar concentration of alkali metal atoms and the molar concentration of alkaline earth metal atoms, each contained per gram of the resin composition, by valences thereof, respectively; and α represents the parts by mass of the polyamide (X) contained in the resin composition, in the formulae.

2. The multilayer bottle according to claim 1, wherein the polyamide (X) is a polyamide comprising a diamine unit containing 70 mol % or more of a m-xylylenediamine unit and a dicarboxylic acid unit containing 70 to 99 mol % of an adipic acid unit and 1 to 30 mol % of an isophthalic acid unit.

3. The multilayer bottle according to claim 1, wherein the multilayer bottle is obtained by blow molding a multilayer preform that is a precursor with a hot parison method or a cold parison method.

4. A production method of a multilayer bottle for producing the multilayer bottle according to claim 1, the method comprising:
   a step (a) of subjecting a diamine containing 70 mol % or more of m-xylylenediamine and a dicarboxylic acid to polycondensation in the presence of a phosphorus atom-containing compound (B0), to obtain a polyamide (X); and a step (b) of blending an alkali compound (A) and a polyester (Z2) with the polyamide (X) obtained in the step (a) to obtain the resin composition.

5. The multilayer bottle according to claim 1, wherein P is 0.32 (μmol/g) or more.

6. The multilayer bottle according to claim 1, wherein M is 27.0 (μmol/g) or more.

7. The multilayer bottle according to claim 1, wherein M satisfies the following formula (3'):

$$M \geq 33.2 - 0.218\alpha \quad (3').$$

* * * * *